(12) United States Patent
Yoshimura et al.

(10) Patent No.: US 11,445,530 B2
(45) Date of Patent: Sep. 13, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 10 days.

(21) Appl. No.: 16/763,146

(22) PCT Filed: Nov. 15, 2018

(86) PCT No.: PCT/JP2018/042292
§ 371 (c)(1),
(2) Date: May 11, 2020

(87) PCT Pub. No.: WO2019/098274
PCT Pub. Date: May 23, 2019

(65) Prior Publication Data
US 2020/0404687 A1 Dec. 24, 2020

(30) Foreign Application Priority Data

Nov. 15, 2017 (JP) .............................. JP2017-219904

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/1819* (2013.01); *H04L 5/0055* (2013.01); *H04W 72/0413* (2013.01); *H04W 72/0453* (2013.01)

(58) Field of Classification Search
CPC ......... H04W 72/1268; H04W 72/0413; H04W 72/0453; H04L 1/1819; H04L 5/0055;
(Continued)

(56) References Cited

U.S. PATENT DOCUMENTS 9,379,876 B2 * 6/2016 Suzuki .................. H04W 52/24
11,196,509 B2 * 12/2021 Yoshimura ............ H04L 1/0071
(Continued)

FOREIGN PATENT DOCUMENTS

WO    2017/026972 A1    2/2017

OTHER PUBLICATIONS

NTT DOCOMO, "New SID Proposal: Study on New Radio Access Technology", RP-160671, 3GPP TSG RAN Meeting #71, Göteborg, Sweden, Mar. 7-10, 2016.
(Continued)

*Primary Examiner* — Hardikkumar D Patel
(74) *Attorney, Agent, or Firm* — ScienBiziP, P.C.

(57) ABSTRACT

A terminal apparatus includes a coding unit configured to map coded bits for an uplink shared channel (UL-SCH) and a first sequence to a set of elements, and a transmitter configured to transmit a physical uplink shared channel (PUSCH), wherein each of the elements is identified by a subcarrier index of the PUSCH and an OFDM symbol index of the PUSCH, and whether the first sequence is mapped without using a prescribed set of elements is given based on at least the number of hybrid automatic repeat request HARQ-ACK bits mapped to the PUSCH.

2 Claims, 10 Drawing Sheets

(51) Int. Cl.
*H04L 5/00* (2006.01)
*H04W 72/04* (2009.01)

(58) Field of Classification Search
CPC . H04L 1/1861; H04L 27/2602; H04L 5/0023; H04L 1/0041; H04L 1/0057; H04L 1/0067; H04L 5/0007; H04L 5/0044; H04L 5/0051; H04L 5/0053; H04L 5/0058; H04L 1/0011; H04L 1/1812; H04B 7/0626; H04B 7/0456
See application file for complete search history.

(56) References Cited

U.S. PATENT DOCUMENTS

| | | | |
|---|---|---|---|
| 2010/0195575 A1* | 8/2010 | Papasakellariou | H04L 5/0055 370/328 |
| 2012/0082079 A1 | 4/2012 | Luo et al. | |
| 2012/0134306 A1 | 5/2012 | Cheng et al. | |
| 2012/0243497 A1 | 9/2012 | Chung et al. | |
| 2015/0009954 A1* | 1/2015 | Chang | H04L 27/2607 370/330 |
| 2015/0071195 A1* | 3/2015 | Park | H04L 5/0048 370/329 |
| 2017/0150501 A1 | 5/2017 | Park | |
| 2017/0290008 A1 | 10/2017 | Tooher et al. | |
| 2018/0110041 A1* | 4/2018 | Bendlin | H04B 1/7143 |
| 2018/0287844 A1* | 10/2018 | Kim | H04L 27/2666 |
| 2018/0332577 A1* | 11/2018 | Yang | H04L 5/0055 |

OTHER PUBLICATIONS

Intel Corporation, "UCI embedding and PUSCH/PUCCH multiplexing", R1-1716316 3GPP TSG RAN WG1 Meeting NR#3, Nagoya, Japan, Sep. 18-21, 2017.

* cited by examiner

Figure A: Table of number of OFDM symbols per slot $N^{symb,\mu}_{slot}$ for subcarrier spacing configuration $\mu$ and normal cyclic prefix

| $\mu$ | $N^{slot}_{symb}$ | slot_configuration | | | | | |
|---|---|---|---|---|---|---|---|
| | | 0 | | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ | |
| 0 | 14 | 10 | 1 | 7 | 20 | 2 | |
| 1 | 14 | 20 | 2 | 7 | 40 | 4 | |
| 2 | 14 | 40 | 4 | 7 | 80 | 8 | |
| 3 | 14 | 80 | 8 | - | - | - | |
| 4 | 14 | 160 | 16 | - | - | - | |
| 5 | 14 | 320 | 32 | - | - | - | |

Figure B: Table of number of OFDM symbols per slot $N^{symb,\mu}_{slot}$ for subcarrier spacing configuration $\mu$ and extended cyclic prefix

| $\mu$ | $N^{slot}_{symb}$ | slot_configuration | | | | | |
|---|---|---|---|---|---|---|---|
| | | 0 | | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ | |
| 2 | 12 | 40 | 4 | 6 | 80 | 8 | |

FIG. 2

| $Q_m$ | Encoded bits $d_0, d_1, \ldots d_{N-1}$ |
|---|---|
| 2 | $[c^{UCI}_0, y]$ |
| 4 | $[c^{UCI}_0, y, x, x]$ |
| 6 | $[c^{UCI}_0, y, x, x, x, x]$ |
| 8 | $[c^{UCI}_0, y, x, x, x, x, x, x]$ |

FIG. 5

| $Q_m$ | Encoded bits $d_0, d_1, ..., d_{N-1}$ |
|---|---|
| 2 | $[c^{UCI}_0, c^{UCI}_1, c^{UCI}_2, c^{UCI}_0, c^{UCI}_1, c^{UCI}_2]$ |
| 4 | $[c^{UCI}_0, c^{UCI}_1, x, x, c^{UCI}_2, c^{UCI}_0, x, x, c^{UCI}_1, c^{UCI}_2, x, x]$ |
| 6 | $[c^{UCI}_0, c^{UCI}_1, x, x, x, x, c^{UCI}_2, c^{UCI}_0, x, x, x, x, c^{UCI}_1, c^{UCI}_2, x, x, x, x]$ |
| 8 | $[c^{UCI}_0, c^{UCI}_1, x, x, x, x, x, x, c^{UCI}_2, c^{UCI}_0, x, x, x, x, x, x, c^{UCI}_1, c^{UCI}_2, x, x, x, x, x, x]$ |

FIG. 6

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-219904 filed on Nov. 15, 2017, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as user equipment (UE). LTE is a cellular communication system in which multiple areas are deployed in a cellular structure, with each of the multiple areas being covered by a base station apparatus. A single base station apparatus may manage multiple serving cells.

The 3GPP has been studying a next generation standard (New Radio or NR) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus efficiently performing communication, a communication method used for the terminal apparatus, a base station apparatus efficiently performing communication, and a communication method used for the base station apparatus.

Solution to Problem (1) A first aspect of the present invention is a terminal apparatus including a coding unit configured to code one transport block and UCI, and a transmitter configured to transmit the one transport block and the UCI on one PUSCH. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

(2) A second aspect of the present invention is a base station apparatus including a receiver configured to receive one PUSCH that includes one transport block and UCI, and is transmitted, and a decoding unit configured to decode the transport block and the UCI. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

(3) A third aspect of the present invention is a communication method used for a terminal apparatus, the method including coding one transport block and UCI, and transmitting the one transport block and the UCI on one PUSCH. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

(4) A fourth aspect of the present invention is a communication method including receiving one PUSCH that includes one transport block and UCI, and is transmitted, and decoding the transport block and the UCI. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

Advantageous Effects of Invention

According to one aspect of the present invention, the terminal apparatus can communicate efficiently. The base station apparatus can communicate efficiently.

BRIEF DESCRIPTION OF DRAWINGS

FIG. 2 is an example illustrating a relationship between $N^{slot}_{symb}$, subcarrier spacing configuration μ, slot configuration, and CP configuration according to one aspect of the present embodiment.

FIG. 5 is a diagram illustrating an example of a first coding method of a bit sequence $c^{UCI}_0$ in a case that KUCI is 1 according to one aspect of the present embodiment.

FIG. 6 is a diagram illustrating an example of the first coding method of a bit sequence $c^{UCI}_k$ ($c^{UCI}_0, c^{UCI}_1$) in a case that KUCI is 2 according to one aspect of the present embodiment.

DESCRIPTION OF EMBODIMENTS

Embodiments of the present invention will be described below.

Figure 1:
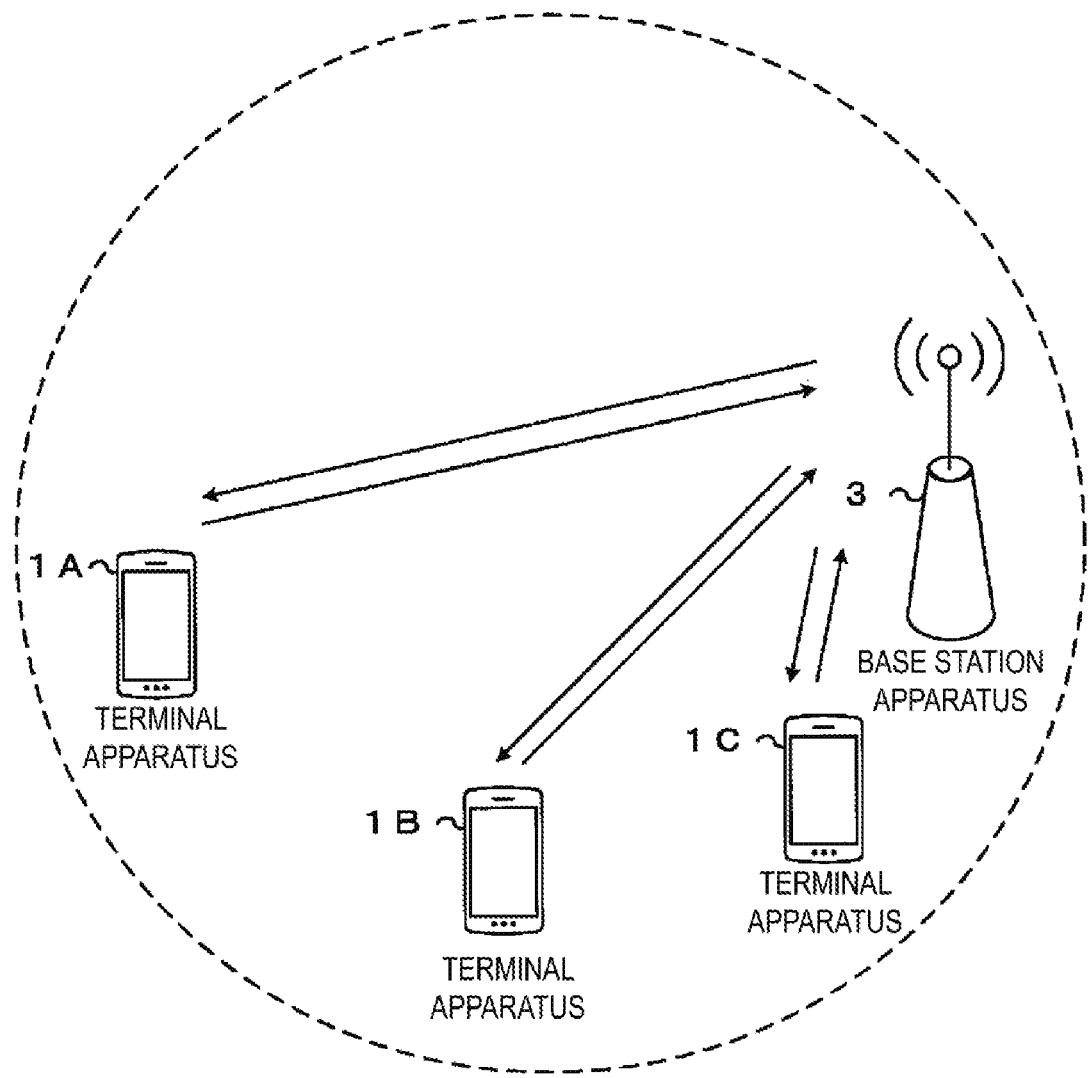
FIG. 1 is a conceptual diagram of a radio communication system according to one aspect of the present embodiment.

FIG. 1 is a conceptual diagram of a radio communication system according to one aspect of the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

Hereinafter, a frame structure will be described.

In a radio communication system according to one aspect of the present embodiment, at least an Orthogonal Frequency Division Multiplex (OFDM) is used. An OFDM symbol which is a unit of a time domain of the OFDM includes at least one or multiple subcarriers, and is converted to a time-continuous signal in generating the baseband signal.

A SubCarrier Spacing (SCS) may be given by a subcarrier spacing $\Delta f = 2^\mu \cdot 15$ kHz. For example, "μ" has any value of 0 to 5. For a Carrier bandwidth part (CBP), the value μ used to configure the subcarrier spacing may be given by a higher layer parameter (subcarrier spacing configuration μ).

In the radio communication system according to one aspect of the present embodiment, a time unit $T_s$ is used to represent a length of a time domain. The time unit $T_s$ is given by $T_s = 1/(\Delta f_{max} \cdot N_f)$. $\Delta f_{max}$ may be the maximum value of the subcarrier spacing supported in the radio communication system according to one aspect of the present embodiment. $\Delta f_{max}$ may be $\Delta f_{max} = 480$ kHz. The time unit $T_s$ is also referred to as $T_s$. A constant κ is $\kappa = \Delta f_{max} \cdot N_f/(\Delta f_{ref} N_{f,ref}) = 64$. $\Delta f_{ref}$ is 15 kHz, and $N_{f,ref} = 2048$.

The constant κ may be a value indicating a relationship between a reference subcarrier spacing and $T_s$. The constant κ may be used for the length of the subframe. The number of slots included in the subframe may be given based on at least the constant κ. $\Delta f_{ref}$ is a reference subcarrier spacing, and $N_{f,ref}$ is a value corresponding to the reference subcarrier spacing.

A transmission in the downlink and/or a transmission in the uplink includes a frame having a length of 10 ms. The frame includes 10 subframes. A length of the subframe is 1 ms. A length of the frame may be given regardless of the subcarrier spacing $\Delta f$. In other words, a frame configuration may be given not based on μ. The length of the subframe may be given regardless of the subcarrier spacing $\Delta f$. In other words, a subframe configuration may be given not based on μ.

For the subcarrier spacing configuration μ, the number and index of slots included in the subframe may be given. For example, a first slot number $n^\mu_s$ may be given in ascending order ranging from 0 to $N^{subframe,\mu}_{slot}-1$ in the subframe. For the subcarrier spacing configuration μ, the number and index of slots included in the frame may be given. For example, a second slot number $n^\mu_{s,f}$ may be given in ascending order ranging from 0 to $N^{frame,\mu}_{slot}-1$ in the frame. Consecutive $N^{slot}_{symb}$ OFDM symbols may be included in one slot. The $N^{slot}_{symb}$ may be given based on at least a part or all of a slot configuration and Cyclic Prefix (CP) configuration. The slot configuration may be given by a higher layer parameter slot_configuration. The CP configuration may be given based on at least the higher layer parameters. The CP configuration may be given based on at least dedicated RRC signaling.

FIG. 2 is an example illustrating a relationship between $N^{slot}_{symb}$, the subcarrier spacing configuration μ, the slot configuration, and the CP configuration according to one aspect of the present embodiment. In FIG. 2A, in a case that the slot configuration is 0 and the CP configuration is a normal cyclic prefix (CP), $N^{slot}_{symb}=14$, $N^{frame,\mu}_{slot}=40$, and $N^{subframe,\mu}_{slot}=4$. In FIG. 2B, in a case that the slot configuration is 0 and the CP configuration is an extended cyclic prefix (CP), $N^{slot}_{symb}=12$, $N^{frame,\mu}_{slot}=40$, and $N^{subframe,\mu}_{slot}=4$. $N^{slot}_{symb}$ for the slot configuration of 0 may correspond to two times $N^{slot}_{symb}$ for the slot configuration of 1.

Hereinafter, a physical resource will be described.

An antenna port is defined based on that a channel on which a symbol is communicated through one antenna port can be estimated from a channel on which another symbol is communicated through the same antenna port. In a case that a large scale property of a channel on which a symbol is communicated through one antenna port can be estimated from a channel on which a symbol is communicated through the other antenna port, these two antenna ports are referred to as being Quasi Co-Located (QCL). The large scale property may include at least a long term performance of the channel. The large scale property may include some or all of delay spread, Doppler spread, Doppler shift, average gain, average delay, and beam parameters (spatial Rx parameters). A first antenna port and a second antenna port being QCL for the beam parameters may mean that a reception beam a receiving side assumes for the first antenna port is the same as a reception beam the receiving side assumes for the second antenna port. The first antenna port and the second antenna port being QCL for the beam parameters may mean that a transmission beam the receiving side assumes for the first antenna port is the same as a transmission beam the receiving side assumes for the second antenna port. In the case that the large scale property of a channel on which a symbol is communicated through one antenna port can be estimated from a channel on which a symbol is communicated through the other antenna port, the terminal apparatus 1 may assume these two antenna ports to be QCL. Two antenna ports being QCL may be equivalent to these two antenna ports being assumed to be QCL.

For each of the subcarrier spacing configurations and a set of carriers, a resource grid of $N^{\mu}_{RB,x} N^{RB}_{sc}$ subcarriers and $N^{(\mu)}_{symb} N^{subframe,\mu}_{symb}$ OFDM symbols is given. $N^{\mu}_{RB,x}$ may indicate the number of resource blocks given for the subcarrier spacing configuration $\mu$ for a carrier x. The carrier x indicates either a downlink carrier or an uplink carrier. In other words, x is "DL" or "UL". $N^{\mu}_{RB}$ is referred as including $N^{\mu}_{RB,DL}$ and $N^{\mu}_{RB,UL}$. $N^{RB}_{sc}$ may indicate the number of subcarriers included in one resource block. One resource grid may be provided for each antenna port p and/or for each subcarrier spacing configuration $\mu$ and/or for each transmission direction configuration. The transmission direction includes at least a DownLink (DL) and an UpLink (UL). Hereinafter, a set of parameters including at least some or all of the antenna port p, the subcarrier spacing configuration $\mu$, and the transmission direction configuration is also referred to as a first radio parameter set. In other words, the resource grid may be given, one for each first radio parameter set.

A carrier corresponding to a serving cell in the downlink is referred to as a downlink carrier (or a downlink component carrier). A carrier corresponding to a serving cell in the uplink is referred to as an uplink carrier (or an uplink component carrier). The downlink component carrier and the uplink component carrier are collectively referred to as a component carrier.

Each element in the resource grid provided for each first radio parameter set is referred to as a resource element. The resource element is identified by an index $k_{sc}$ of a frequency domain and an index 1 of a time domain. For a first radio parameter set, a resource element is identified by an index $k_{sc}$ of the frequency domain and an index 1 of the time domain. The resource element identified by the index $k_{sc}$ of the frequency domain and the index 1 of the time domain is also referred to as a resource element ($k_{sc}$, 1). The index $k_{sc}$ of the frequency domain indicates any value from 0 to $N^{\mu}_{RB} N^{RB}_{sc} - 1$. $N^{\mu}_{RB}$ may be the number of resource blocks given for the subcarrier spacing configuration $\mu$. $N^{RB}_{sc}$ is the number of subcarriers included in the resource block, and $N^{RB}_{sc} = 12$ holds. The index $k_{sc}$ of the frequency domain may correspond to a subcarrier index $k_{sc}$. The index 1 of the time domain may correspond to an OFDM symbol index 1.

Figure 3:
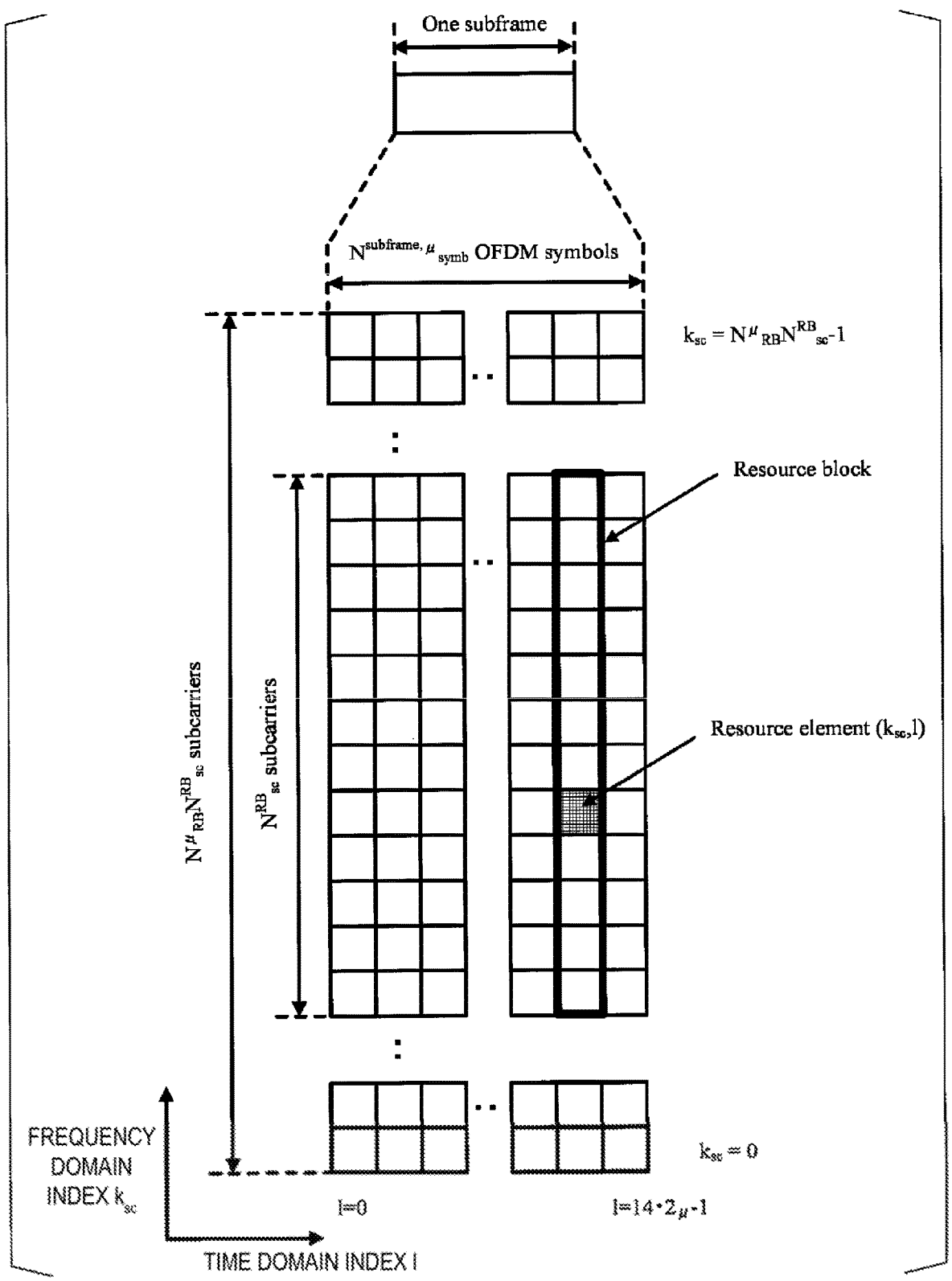
FIG. 3 is a schematic diagram illustrating an example of a resource grid in a subframe according to one aspect of the present embodiment.

FIG. 3 is a schematic diagram illustrating an example of a resource grid in a subframe according to one aspect of the present embodiment. In the resource grid of FIG. 3, a horizontal axis is the index 1 of the time domain and a vertical axis is the index $k_{sc}$ of the frequency domain. In one subframe, the frequency domain of the resource grid includes $N^{\mu}_{RB} N^{RB}_{sc}$ subcarriers, and the time domain of the resource grid may include 14·2$\mu$ OFDM symbols. The resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may be indicated to perform transmission and/or reception using only a subset of resource grids. The subset of the resource grids is also referred to as a carrier bandwidth part, and the carrier bandwidth part may be given by higher layer parameters and/or the DCI. The carrier bandwidth part is also referred to as a bandwidth part (BP). In other words, the terminal apparatus 1 need not be indicated to perform transmission and/or reception using all sets of resource grids. In other words, the terminal apparatus 1 may be indicated to perform transmission and/or reception using some frequency resources in the resource grid. One carrier bandwidth part includes multiple resource blocks in the frequency domain. One carrier bandwidth part may include multiple resource blocks continuous in the frequency domain. The carrier bandwidth part is also referred to as a BandWidth Part (BWP). The carrier bandwidth part configured for the downlink carrier is also referred to as a downlink carrier bandwidth part. The carrier bandwidth part configured for the uplink carrier is also referred to as an uplink carrier bandwidth part.

A set of downlink carrier bandwidth parts may be configured for each serving cell. The set of downlink carrier bandwidth parts may include one or multiple downlink carrier bandwidth parts. A set of uplink carrier bandwidth parts may be configured for each serving cell. The set of uplink carrier bandwidth parts may include one or multiple uplink carrier bandwidth parts.

The higher layer parameter is a parameter included in higher layer signaling. The higher layer signaling may be a Radio Resource Control (RRC) signaling or a Medium Access Control Control Element (MAC CE). Here, the higher layer signaling may be the RRC layer signaling or MAC layer signaling.

The higher layer signaling may be common RRC signaling. The common RRC signaling includes at least some or all of the following feature C1 to feature C3.

Feature C1) Being mapped to a BCCH logical channel or a CCCH logical channel

Feature C2) Including at least radioResourceConfigCommon information element.

Feature C3) Being mapped to a PBCH.

The radioResourceConfigCommon information element may include information indicating a configuration commonly used in the serving cell. The configuration commonly used in the serving cell may include at least a PRACH configuration. The PRACH configuration may indicate at least one or multiple random access preamble indexes. The PRACH configuration may indicate at least a PRACH time/frequency resource.

The higher layer signaling may be dedicated RRC signaling. The dedicated RRC signaling includes at least some or all of the following features D1 or D2.

Feature D1) Being mapped to a DCCH logical channel.

Feature D2) Including at least radioResourceConfigDedicated information element.

The radioResourceConfigDedicated information element may include at least information indicating a configuration specific to the terminal apparatus 1. The radioResourceConfigDedicated information element may include at least information indicating a configuration of the carrier bandwidth part. The configuration of the carrier bandwidth part may indicate at least a frequency resource of the carrier bandwidth part.

For example, a MIB, first system information, and second system information may be included in the common RRC signaling. A higher layer message mapped to the DCCH logical channel and including at least radioResourceConfigCommon may be included in the common RRC signaling. A higher layer message mapped to the DCCH logical channel and not including the radioResourceConfigCommon information element may be included in the dedicated RRC signaling. The higher layer message mapped to the DCCH logical channel and including at least the radioResourceConfigDedicated information element may be included in the dedicated RRC signaling.

The first system information may indicate at least a time index of a Synchronization Signal (SS) block. An SS block is also referred to as an SS/PBCH block. The first system information may include information associated with a PRACH resource. The first system information may include information associated with an initial connection configuration. The second system information may be system information other than the first system information.

The radioResourceConfigDedicated information element may include at least the information on the PRACH resource. The radioResourceConfigDedicated information element may include at least the information on the initial connection configuration.

A physical channel and a physical signal according to various aspects of the present embodiment will be described below.

An uplink physical channel may correspond to a set of resource elements carrying information generated in the higher layer. The uplink physical channel is a physical channel used in the uplink. In the radio communication system according to one aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes Channel State Information (CSI), a Scheduling Request (SR), and a Hybrid Automatic Repeat request ACKnowledgement (HARQ-ACK) for downlink data (Transport block (TB), Medium Access Control Protocol Data Unit (MAC PDU), Downlink-Shared Channel (DL-SCH), Physical Downlink Shared Channel (PDSCH). The HARQ-ACK may indicate an acknowledgement (ACK) or negative-acknowledgement (NACK) for the downlink data.

The HARQ-ACK may indicate an ACK or NACK corresponding to each of the one or multiple Code Block Groups (CBGs) included in the downlink data. The HARQ-ACK is also referred to as HARQ feedback, HARQ information, HARQ control information, and ACK/NACK.

The scheduling request may be used to request the PUSCH resource for initial transmission.

The channel state information may include some or all of a Channel Quality Indicator (CQI) and a Rank Indicator (RI). The channel quality indicator may include a Precoder Matrix Indicator (PMI). The CQI is an indicator associated with channel quality (for example, propagation strength), and the PMI is an indicator indicating a precoder. The RI is an indicator indicating a transmission rank (or the number of transmission layers).

The PUSCH is used to transmit uplink data (TB, MAC PDU, UL-SCH, PUSCH). The PUSCH may be used to transmit the HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PUSCH is given based on at least some or all of Scrambling, Modulation, layer mapping, Transform precoding, precoding, and Mapping to physical resource. The terminal apparatus 1 may assume that the PUSCH is given based on at least some or all of scrambling, modulation, layer mapping, transform precoding, precoding, and mapping to physical resource.

In the scrambling, for a codeword q, a block $b^{(q)}(i)$ of bits may be scrambled based on at least a scrambling sequence $c^{(q)}(i)$ to generate $b^{(q)}_{sc}(i)$. In the block $b^{(q)}(i)$ of bits, i is an index representing a value ranging from 0 to $M^{(q)}_{bit}-1$. $M^{(q)}_{bit}$ may represent the number of bits of the codeword q transmitted on the PUSCH. The scrambling sequence $c^{(q)}(i)$ may be a sequence given based on at least a pseudo-random function (e.g., a M sequence, a Gold sequence, or the like). In the scrambling, for the codeword q, the block $b^{(q)}(i)$ of bits may be scrambled based on the scrambling sequence $c^{(q)}(i)$ and the following Equation (1) to generate block $b^{(q)}_{sc}(i)$ of scrambling bits.

$$b_{sc}^{(q)}(i) = \mathrm{mod}(b^{(q)}(i) + c^{(q)}(i), 2) \quad \text{Equation 1}$$

mod(A, B) may be a function that outputs a remainder of A divided by B. mod(A, B) may be a function that outputs a value corresponding to a remainder of A divided by B.

In the modulation, for the codeword q, the block $b^{(q)}_{sc}(i)$ of scrambling bits may be modulated based on a prescribed modulation scheme, and a block $d^{(q)}(i_{mod})$ of complex-valued modulation symbols may be generated. In the block $d^{(q)}(i_{mod})$ of complex-valued modulation symbols, $i_{mod}$ represents a value ranging from 0 to $M^{(q)}_{symb}-1$. $M^{(q)}_{symb}$ may represent the number of complex-valued modulation symbols of the codeword q transmitted on the PUSCH. The prescribed modulation scheme may include at least some or all of Quadrature Phase Shift Keying (QPSK), 16 Quadrature Amplitude Modulation (QAM), 64 QAM, 256 QAM, and the like. Note that the prescribed modulation scheme may be given based on at least the DCI for scheduling the PUSCH.

In the layer mapping, the block $d^{(q)}(i_{mod})$ of complex-valued modulation symbols for each codeword is mapped to one or multiple layers based on a prescribed mapping procedure, and a block $x(i_{layer})$ of complex-valued modulation symbols may be generated. In the block $x(i_{layer})$ of complex-valued modulation symbols, $i_{layer}$ represents a value ranging from 0 to $M^{layer}_{symb}-1$. $M^{layer}_{symb}$ may represent the number of complex-valued modulation symbols per layer. The block $x(i_{layer})$ of the complex-valued modulation symbols may be $x(i_{layer}) = [x^{(0)}(i_{layer}) \ldots x^{(\nu-1)}(i_{layer})]^T$. Here, $[*]^T$ may indicate that rows and columns of "*" are transposed. The number of elements in the block $x(i_{layer})$ of complex-valued modulation symbols may correspond to the number of layers for all code words transmitted on the PUSCH. Here, $\nu$ represents the number of layers for the PUSCH.

In a case that the transform precoding is configured for the PUSCH, $\nu=1$ holds, and the block $x(i_{layer})$ of complex-valued modulation symbols is divided into sets of $M^{layer}_{symb}/M^{PUSCH}_{sc}$ complex-valued modulation symbols. Here, $M^{PUSCH}_{sc}$ may correspond to the number of subcarriers allocated for the PUSCH. $M^{PUSCH}_{sc}$ may be given by $M^{PUSCH}_{RB} \times N^{RB}_{sc}$. $M^{PUSCH}_{RB}$ may represent a band of the PUSCH represented as the number of resource blocks. $M^{PUSCH}_{RB}$ may represent the number of resource blocks included in the PUSCH. In the case that the transform precoding is configured for the PUSCH, it may be configured to satisfy $M^{PUSCH}_{RB} = 2^{\alpha 2} \times 3^{\alpha 3} \times 5^{\alpha 5}$. Here, $\alpha 2$ represents an integer that is not negative. $\alpha 3$ represents an integer that is not negative. $\alpha 5$ represents an integer that is not negative. $N^{RB}_{sc}$ may represent the number of subcarriers included in the resource block. Specifically, $N^{RB}_{sc}$ may be $N^{RB}_{sc}=12$. Each of the sets of $M^{layer}_{symb}/M^{PUSCH}_{sc}$ complex-valued modulation symbols may correspond to one OFDM symbol.

In the case that the transform precoding is configured for the PUSCH, a block $y^{(\lambda)}(i_{layer})$ of complex-valued modulation symbol may be given based on at least the following Equation (2).

$$y^{(\lambda)}(l \cdot M^{PUSCH}_{sc} + k_{sc}) = \frac{1}{\sqrt{M^{PUSCH}_{sc}}} \sum_{i=0}^{M^{PUSCH}_{sc}-1} x^{(\lambda)}(l \cdot M^{PUSCH}_{sc} + i) e^{-j\frac{2\pi i k_{sc}}{M^{PUSCH}_{sc}}} \quad \text{Equation 2}$$

In Equation (2), $\lambda$ represents the index of the layer. In the case that the transform precoding is configured for the PUSCH, $\lambda$ may be $\lambda=0$. j represents an imaginary unit. $\pi$ represents the ratio of the circumference of a circle to its diameter. e represents the Napier's constant. $k_{sc}$ represents a range from 0 to $M^{PUSCH}_{sc}-1$. l represents a range from 0 to $M^{layer}_{symb}/M^{PUSCH}_{sc}-1$.

In a case that the transform precoding is not configured for the PUSCH, the block $y^{(\lambda)}(i_{layer})$ of the complex-valued modulation symbols may be $y^{(\lambda)}(i_{layer})=x^{(\lambda)}(i_{layer})$.

In the precoding, the block $y(i_{layer})$ of complex-valued modulation symbols may be subjected to a prescribed precoding to give $z(i_{layer})$. $y(i_{layer})$ may be $y(i_{layer})=[y^{(0)}(i_{layer}) \ldots y^{(v-1)}(i_{layer})]^T$. $i_{ap}$ represents a value ranging from 0 to $M^{layer}_{symb}-1$. $z(i_{ap})$ may be $z(i_{ap})=[z^{(0)}(i_{ap}) \ldots z^{(P-1)}(i_{ap})]^T$. Here, in a case that a matrix for the precoding is W, $z(i^{ap})=Wy(i_{layer})$ may be given. P represents the number of antenna ports for the PUSCH. P may be the same as v. In the precoding, the block $y(i_{layer})$ of complex-valued modulation symbols may be converted to the block $z(i_{ap})$ of complex-valued modulation symbols for P antenna ports. The number of rows in the matrix W for the precoding may correspond to the number P of antenna ports. The number of columns in the matrix W for the precoding may correspond to the number v of layers.

For the matrix W for the precoding, one or multiple codebooks may be configured. The number of codebooks may be given based on at least the number $\lambda$ of layers for the PUSCH and/or the number P of antenna ports for the PUSCH. In codebook based transmission, one codebook may be selected for the PUSCH. In non codebook based transmission, the matrix W for the precoding may be an identity matrix.

In the codebook based transmission, the block $y^{(\lambda)}(i_{layer})$ of complex-valued modulation symbols mapped to one layer may correspond to a prescribed number of antenna ports. The prescribed number may correspond to the number of rows in the matrix W for the precoding. In the codebook based transmission, block $y^{(\lambda)}(i_{layer})$ of complex-valued modulation symbols mapped to one layer may correspond to all antenna ports for the PUSCH. In the non codebook based transmission, block $y^{(\lambda)}(i_{layer})$ of complex-valued modulation symbols mapped to one layer may correspond to one antenna port. In the non codebook based transmission, the block $y^{(\lambda)}(i_{layer})$ of the complex-valued modulation symbols mapped to one layer may be $y^{(\lambda)}(i_{layer})=z^{(p)}(i_{layer})$. p represents an index for the antenna port.

In the case that the transform precoding is not configured for the PUSCH, in mapping (physical resource mapping) to the physical resource, block $z^{(p)}(i_{ap})$ of complex-valued modulation symbols for the antenna port p may be mapped to the resource elements ($k_{sc}$, l) of the resource blocks allocated for the PUSCH with priority being given to the subcarrier index $k_{sc}$, except for the resource elements at least satisfying some or all of elements A1 to A4 below. Here, p may represent the index of the antenna port. p represents a value ranging from 0 to P−1. Here, the mapping with priority being given to the subcarrier index $k_{sc}$ may be mapping to the resource element ($k_{sc}$, l) in such an order, from $k_{sc}$ to $k_{sc}+M$ (M represents a prescribed value) in the symbol l, from $k_{sc}$ to $k_{sc}+M$ in the symbol l+1, . . . , and from $k_{sc}$ to $k_{sc}+M$ in the symbol l+N (N represents a prescribed value).

Element A1) Resource element to which a UL DMRS associated with the PUSCH is mapped.

Element A2) Resource Element to which a UL PTRS is mapped.

Element A3) Resource to which an SRS transmission is configured.

Element A4) Reservation resource

The reservation resource may be a resource that is at least configured for rate matching of the PUSCH. The reservation resource may be indicated by a group common PDCCH.

The index $k_{sc}$ of the frequency domain and the index l of the time domain included in the resource element ($k_{sc}$, l) are also referred to as an index pair. The index pair includes at least an index $k_{sc}$ of the frequency domain and the index l of the time domain. The index pair may not include the index p of the antenna port. The index pair of the resource element indicated by the index $k_{sc}$ of the frequency domain and the index l of the time domain is also referred to as an index pair ($k_{sc}$, l).

In the case that the transform precoding is configured for the PUSCH, in mapping (physical resource mapping) to the physical resource, block $z^{(p)}(i_{ap})$ of complex-valued modulation symbols for the antenna port p may be mapped to the resource elements ($k_{sc}$, l) of the resource blocks allocated for the PUSCH with priority being given to the subcarrier index $k_{sc}$, except for the resource elements at least satisfying some or all of elements B1 to B4 below. Here, p may represent the index of the antenna port. p represents a value ranging from 0 to P−1. Here, the mapping with priority being given to the subcarrier index $k_{sc}$ may be mapping to the resource element ($k_{sc}$, l) in such an order, from $k_{sc}$ to $k_{sc}+M$ (M represents a prescribed value) in the symbol l, from $k_{sc}$ to $k_{sc}+M$ in the symbol l+1, . . . , and from $k_{sc}$ to $k_{sc}+M$ in the symbol l+N (N represents a prescribed value).

Element B1) OFDM symbol including at least a resource element to which a UL DMRS associated with the PUSCH is mapped.

Element B2) Resource Element to which a UL PTRS is mapped.

Element B3) Resource to which an SRS transmission is configured.

Element B4) Reservation Resource

Regardless of whether or not the transform precoding is configured for the PUSCH, in mapping (physical resource mapping) to the physical resource, block $z^{(p)}(i_{ap})$ of complex-valued modulation symbols for the antenna port p may be mapped to the resource elements ($k_{sc}$, l) of the resource blocks allocated for the PUSCH with priority being given to the subcarrier index $k_{sc}$, except for the resource elements at least satisfying some or all of elements B1 to B4 below. Here, p may represent the index of the antenna port. p represents a value ranging from 0 to P−1. Here, the mapping with priority being given to the subcarrier index $k_{sc}$ may be mapping to the resource element ($k_{sc}$, l) in such an order, from $k_{sc}$ to $k_{sc}+M$ (M represents a prescribed value) in the symbol 1, from $k_{sc}$ to $k_{sc}+M$ in the symbol 1+1, . . . , and from $k_{sc}$ to $k_{sc}+M$ in the symbol 1+N (N represents a prescribed value).

Element C1) Resource element to which a UL DMRS associated with the PUSCH is mapped.

Element C2) Resource Element to which a UL PTRS is mapped.

Element C3) Resource to which an SRS transmission is configured.

Element C4) Reservation Resource

The PRACH may be used to transmit a random access preamble (random access message 1). The PRACH is used to indicate an initial connection establishment procedure, a handover procedure, a connection re-establishment procedure, synchronization (timing adjustment) for uplink data transmission, and a request for the PUSCH resource. The random access preamble may be used to notify the base station apparatus 3 of an index (random access preamble index) given by the higher layer of the terminal apparatus 1.

The random access preamble may be provided by cyclic-shifting of a Zadoff-Chu sequence corresponding to a physical root sequence index u. The Zadoff-Chu sequence may be generated based on the physical root sequence index u. In a single serving cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be provided based on at least information included in the system information. The physical root sequence index u may be an index for identifying a sequence included in the random access preamble. The random access preamble may be identified based on at least the physical root sequence index u.

In FIG. 1, the following uplink physical signal is used for the uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of the PUSCH and/or the PUCCH. The UL DMRS is multiplexed with the PUSCH or the PUCCH. The base station apparatus 3 may use the UL DMRS in order to perform channel compensation of the PUSCH or the PUCCH. Hereinafter, transmission of both the PUSCH and the UL DMRS associated with the PUSCH is simply referred as transmission of the PUSCH. Hereinafter, transmission of both the PUCCH and the UL DMRS associated with the PUCCH is simply referred as transmission of the PUCCH. The UL DMRS associated with the PUSCH is also referred to as a UL DMRS for PUSCH. The UL DMRS associated with the PUCCH is also referred to as a UL DMRS for PUCCH.

The SRS need not be associated with transmission of the PUSCH or the PUCCH. The base station apparatus 3 may use the SRS for measuring a channel state. The SRS may be transmitted at the end of the subframe in an uplink slot or in a prescribed number of OFDM symbols from the end.

The UL PTRS may be a reference signal that is used at least for phase tracking. The UL PTRS may be associated with an UL DMRS group that includes at least an antenna port used for one or multiple UL DMRSs. The UL PTRS being associated with the UL DMRS group may be equivalent to some or all of the antenna ports for the UL PTRS and the antenna ports included in the UL DMRS groups being at least QCL. The UL DMRS group may be identified based on at least the lowest index antenna port for the UL DMRS included in the UL DMRS group. The UL PTRS may be mapped to the lowest index antenna port of one or multiple antenna ports to which one codeword is mapped. In a case that one codeword is mapped to at least a first layer and a second layer, the UL PTRS may be mapped to the first layer. The UL PTRS may not be mapped to the second layer. The index of the antenna port to which the UL PTRS is mapped may be given based on at least the downlink control information.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)
Physical Downlink Control Channel (PDCCH)
Physical Downlink Shared Channel (PDSCH)

The PBCH is used to transmit a master information block (MIB, BCH, or Broadcast Channel). The PBCH may be transmitted based on a prescribed transmission interval. For example, the PBCH may be transmitted at an interval of 80 ms. Contents of information included in the PBCH may be updated at every 80 ms. The PBCH may include 288 subcarriers. The PBCH may include two, three, or four OFDM symbols. The MIB may include information on an identifier (index) of a synchronization signal. The MIB may include information for indicating at least some of the number of the slot in which PBCH is transmitted, the number of the subframe in which PBCH is transmitted, and the number of the radio frame in which PBCH is transmitted.

The PDCCH is used to transmit Downlink Control Information (DCI). The downlink control information is also called a DCI format. The downlink control information may at least include any of a downlink grant or an uplink grant. The DCI format used for the scheduling of the PDSCH may be referred to as a downlink grant. The DCI format used for the scheduling of the PUSCH may be referred to as an uplink grant. The downlink grant is also referred to as a downlink assignment or a downlink allocation.

The DCI format may include at least some or all of a TBS information field mapped to information bits that indicate at least a size of a transport block (Transport Block Size (TBS)) transmitted on the PDSCH, a resource allocation information field (Resource allocation field) mapped to information bits that indicate at least a set of resource blocks to which the PDSCH is mapped in the frequency domain, an MCS information field mapped to information bits that indicate at least a modulation scheme for the PDSCH, a HARQ process number information field mapped to information bits that indicate at least a HARQ process number corresponding to the transport block, an NDI indication information field mapped to information bits that indicate at least a New Data Indicator (NDI) corresponding to the transport block, and an RV information field mapped to information bits that indicate at least a Redundancy Version (RV) for the transport block.

One or multiple information fields included in the DCI format may be mapped to information bits provided by joint coding of the multiple pieces of indication information. For example, the DCI format may include the MCS information field mapped to information bits provided based on at least joint coding of the information associated with the TBS and the information indicating the modulation scheme of the PDSCH.

In various aspects of the present embodiment, unless otherwise specified, the number of resource blocks indicates the number of resource blocks in the frequency domain.

One downlink grant is used at least for scheduling of one PDSCH within one serving cell. The downlink grant is used at least for the scheduling of the PDSCH in the same slot as the slot in which the downlink grant is transmitted.

One uplink grant is used at least for scheduling of one PUSCH in one serving cell.

One physical channel is mapped to one serving cell. One physical channel is mapped to multiple serving cells.

The terminal apparatus 1 is configured with one or multiple Control Resource Sets (CORESETs) for searching for the PDCCH. The terminal apparatus 1 attempts to receive the PDCCH in the one or multiple control resource sets.

The control resource set may indicate a time frequency domain in which one or multiple PDCCHs can be mapped. The control resource set may be a region in which the terminal apparatus 1 attempts to receive the PDCCH. The control resource set may include a continuous resource (Localized resource). The control resource set may include a non-continuous resource (distributed resource).

In the frequency domain, the unit of mapping the control resource sets may be a resource block. For example, in the frequency domain, the unit of mapping the control resource sets may be six resource blocks. In the time domain, the unit of mapping the control resource sets may be the OFDM symbol. For example, in the time domain, the unit of mapping the control resource sets may be one OFDM symbol.

The frequency domain of the control resource set may be identical to the system bandwidth of the serving cell. The frequency domain of the control resource set may be provided based on at least the system bandwidth of the serving cell. The frequency domain of the control resource set may be provided based on at least higher layer signaling and/or downlink control information.

The time domain of the control resource set may be provided based on at least higher layer signaling and/or downlink control information.

A control resource set may be a Common control resource set. The common control resource set may be a control resource set configured commonly to the multiple terminal apparatuses 1. The common control resource set may be provided based on at least some or all of the MIB, the first system information, the second system information, the common RRC signaling, and a cell ID. For example, a time resource and/or frequency resource of the control resource set configured to monitor the PDCCH used for the scheduling of the first system information may be given based on at least the MIB.

A control resource set may be a dedicated control resource set. The dedicated control resource set may be a control resource set configured to be dedicatedly used for the terminal apparatus 1. The dedicated control resource set may be provided based on at least some or all of the dedicated RRC signaling and a value of C-RNTI.

The control resource set may include a set of PDCCHs (or PDCCH candidates) to be monitored by the terminal apparatus 1. The control resource set may include one or multiple Search Spaces (SS).

The search space includes one or multiple PDCCH candidates of an aggregation level. The terminal apparatus 1 receives a PDCCH candidate included in the search space and attempts to receive the PDCCH. Here, the PDCCH candidate is also referred to as a blind detection candidate.

A set of search spaces includes one or multiple search spaces. A set of search areas may be a Common Search Space (CSS). The CSS may be provided based on at least some or all of the MIB, the first system information, the second system information, the common RRC signaling, and the cell ID.

A set of search spaces may be a UE-specific Search Space (USS). The USS may be provided based on at least some or all of the dedicated RRC signaling and the value of C-RNTI.

The common control resource set may include at least one or both of the CSS and the USS. The dedicated control resource set may include at least one or both of the CSS and the USS.

A physical resource of the search space includes a configuration unit of the control channels (a Control Channel Element (CCE)). The CCE includes a prescribed number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used to transmit downlink data (DL-SCH, PDSCH). The PDSCH is used at least to transmit the random access message 2 (random access response). The PDSCH is used at least to transmit system information including parameters used for initial access.

In FIG. 1, the following downlink physical signals are used for the downlink radio communication. The downlink physical signal need not be used for transmitting the information output from the higher layer, but is used by the physical layer.

Synchronization signal (SS)
DownLink Demodulation Reference Signal (DL DMRS)
Shared Reference Signal (Shared RS)
Channel State Information-Reference Signal (CSI-RS)
DownLink Phrase Tracking Reference Signal (DL PTRS)
Tracking Reference Signal (TRS)

The synchronization signal is used for the terminal apparatus 1 to establish synchronization in the frequency domain and/or time domain in the downlink. The synchronization signal includes a Primary Synchronization Signal (PSS) and a Secondary Synchronization Signal (SSS).

The SS block (SS/PBCH block) includes at least some or all of the PSS, the SSS, and the PBCH. The respective antenna ports for some or all of the PSS, the SSS, and the PBCH included in the SS block may be the same. Some or all of the PSS, the SSS, and the PBCH included in the SS block may be mapped to continuous OFDM symbols. The respective CP configurations for some or all of the PSS, the SSS, and the PBCH included in the SS block may be the same. The respective configurations p of the subcarrier spacing for some or all of the PSS, the SSS, and the PBCH included in the SS block may be the same.

The DL DMRS is associated with transmission of the PBCH, the PDCCH and/or the PDSCH. The DL DMRS is multiplexed with the PBCH, the PDCCH, or the PDSCH. The terminal apparatuses 1 may use the DL DMRS corresponding to the PBCH, the PDCCH, or the PDSCH in order to perform channel compensation of the PBCH, the PDCCH, or the PDSCH. Hereinafter, the transmission of both the PBCH and the DL DMRS associated with the PBCH is simply referred to as transmission of the PBCH. Hereinafter, transmission of both of the PDCCH and the DL DMRS associated with the PDCCH is simply referred to as transmission of the PDCCH. Hereinafter, transmission of both of the PDSCH and the DL DMRS associated with the PDSCH is simply referred to as transmission of the PDSCH. The DL DMRS associated with the PBCH is also referred to as a DL DMRS for PBCH. The DL DMRS associated with the PDSCH is also referred to as a DL DMRS for PDSCH. The DL DMRS associated with the PDCCH is also referred to as a DL DMRS associated with the PDCCH.

The Shared RS may be associated with at least the transmission of the PDCCH. The Shared RS may be multiplexed with the PDCCH. The terminal apparatuses 1 may use the Shared RS in order to perform channel compensation of the PDCCH. Hereinafter, transmission of both the PDCCH and the Shared RS associated with the PDCCH is also simply referred to as transmission of the PDCCH.

The DL DMRS may be a reference signal configured individually for the terminal apparatus 1. A sequence of the DL DMRS may be given based on at least parameters configured individually for the terminal apparatus 1. The sequence of the DL DMRS may be given based on at least a UE-specific value (e.g., a C-RNTI, and the like). The DL DMRS may be individually transmitted for the PDCCH and/or the PDSCH. On the other hand, the Shared RS may be a reference signal which is configured commonly to multiple terminal apparatuses 1. A sequence of the Shared RS may be given regardless of the parameters configured individually for the terminal apparatus 1. For example, the sequence of the Shared RS may be given based on at least some of the number of the slot, the number of a mini slot, and the cell identity (ID). The Shared RS may be a reference signal to be transmitted regardless of whether or not the PDCCH and/or the PDSCH are transmitted.

The CSI-RS may be a signal that is used at least to calculate the channel state information. A pattern of the CSI-RS assumed by the terminal apparatus may be given by at least a higher layer parameter.

The PTRS may be a signal that is used at least to compensate a phase noise. A pattern of the PTRS assumed by the terminal apparatus may be given based on at least a higher layer parameter and/or the DCI.

The DL PTRS may be associated with a DL DMRS group that includes at least an antenna port used for one or multiple DL DMRSs. The DL PTRS being associated with the DL DMRS group may be equivalent to that some or all of the antenna ports for the DL PTRS and the antenna ports included in the DL DMRS groups are at least QCL. The DL DMRS group may be identified based on at least the lowest index antenna port for the DL DMRS included in the DL DMRS group.

The TRS may be a signal that is used at least to establish synchronization in the time and/or the frequency. A pattern of the TRS assumed by the terminal apparatus may be given based on at least a higher layer parameter and/or the DCI.

The downlink physical channels and the downlink physical signals are also collectively referred to as downlink signals. The uplink physical channels and the uplink physical signals are also collectively referred to as uplink signals. The downlink signals and the uplink signals are also collectively referred to as physical signals. The downlink signals and the uplink signals are also collectively referred to as signals. The downlink physical channels and the uplink physical channels are collectively referred to as physical channels. The downlink physical signals and the uplink physical signals are collectively referred to as physical signals.

The Broadcast CHannel (BCH), the Uplink Shared CHannel (UL-SCH) and the Downlink-Shared CHannel (DL-SCH) are transport channels. A channel used in a Medium Access Control (MAC) layer is referred to as a transport channel. A unit of the transport channels used in the MAC layer is also referred to as a transport block (TB) or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio resource control (RRC) layer. Furthermore, the base station apparatus 3 and the terminal apparatus 1 may transmit and/or receive the MAC Control Element (CE) in the MAC layer. Here, the RRC signaling and/or the MAC CE is also referred to as higher layer signaling.

The PUSCH and the PDSCH may be used at least to transmit the RRC signaling and/or the MAC CE. Here, the RRC signaling transmitted from the base station apparatus 3 on the PDSCH may be signaling common to the multiple terminal apparatuses 1 in the serving cell. The signaling common to the multiple terminal apparatuses 1 in the serving cell is also referred to as common RRC signaling. The RRC signaling transmitted from the base station apparatus 3 on the PDSCH may be signaling dedicated to a certain terminal apparatus 1 (also referred to as dedicated signaling or UE specific signaling). The signaling dedicated to the terminal apparatus 1 is also referred to as dedicated RRC signaling. A higher layer parameter specific to the serving cell may be transmitted by using the signaling common to the multiple terminal apparatuses 1 in the serving cell or the signaling dedicated to the certain terminal apparatus 1. A UE-specific higher layer parameter may be transmitted by using the signaling dedicated to the certain terminal apparatus 1. The PDSCH including the dedicated RRC signaling may be scheduled via the PDCCH in the first control resource set.

The Broadcast Control CHannel (BCCH), the Common Control CHannel (CCCH), and the Dedicated Control CHannel (DCCH) are logical channels. For example, the BCCH is a channel of the higher layer used to transmit the MIB. The Common Control CHannel (CCCH) is a channel of the higher layer used to transmit information common to the multiple terminal apparatuses 1. Here, the CCCH is used for a terminal apparatus 1 that is not in an RRC-connected state, for example. The Dedicated Control CHannel (DCCH) is a channel of the higher layer used to transmit control information dedicated to the terminal apparatus 1 (dedicated control information). Here, the DCCH is used for a terminal apparatus 1 that is in the RRC-connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

A coding method for the codeword q of the PUSCH will be described below. Here, the codeword q corresponds to at least one transport block $a_k$.

Figure 4:
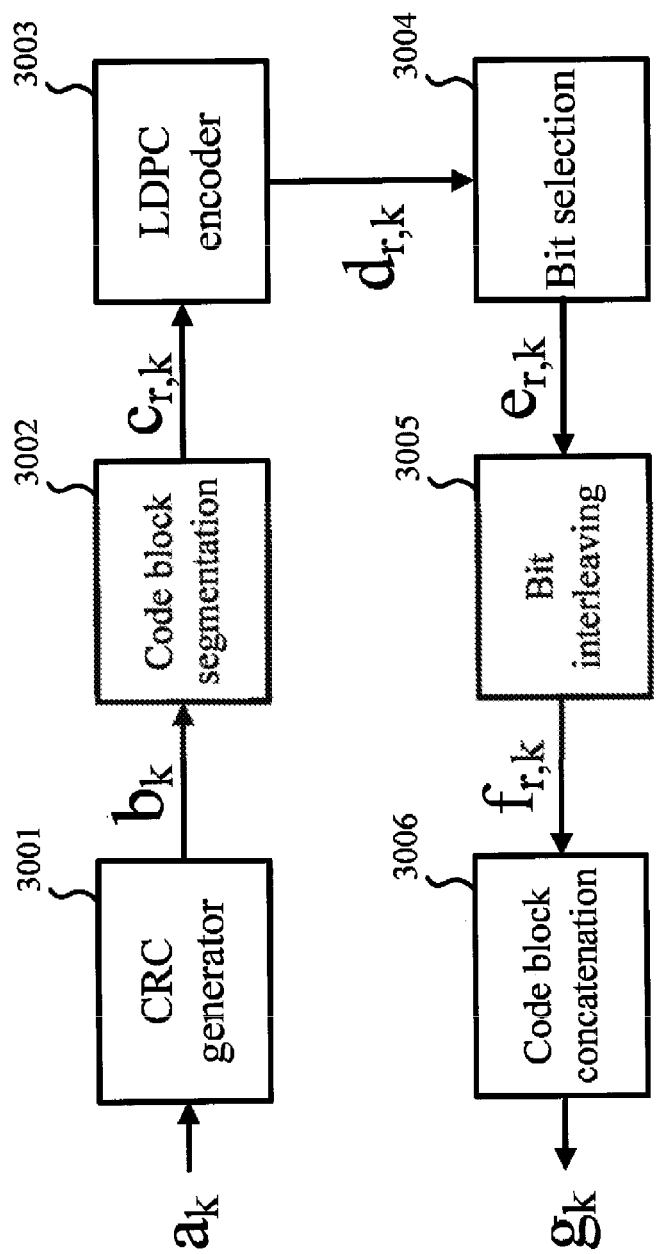
FIG. 4 is s diagram illustrating an example of a coding of a transport block $a_k$ ($a_0, \ldots a_{A-1}$) in a baseband unit 13 according to one aspect of the present embodiment.

FIG. 4 is s diagram illustrating an example of a coding of a transport block $a_k$ ($a_0, \ldots, a_{A-1}$) in a baseband unit 13 according to one aspect of the present embodiment. The baseband unit 13 may include at least some or all of a CRC generator 3001, a Code block segmentation unit 3002, a Low Density Parity Check (LDPC) encoder 3003, a Bit selection unit 3004, a Bit interleaving unit 3005, and a Code block concatenation unit 3006.

The CRC generator 3001 generates a first CRC sequence $p_k$ ($p_0, \ldots, p_{L1-1}$) based on at least the transport block $a_k$ ($a_0, \ldots a_{A-1}$). The first CRC sequence $p_k$ provides error detection of the transport block $a_k$. Here, A corresponds to a TBS for the transport block. L1 corresponds to the number of parity bits included in the first CRC sequence.

The code block segmentation unit 3002 segments a transport block $b_k$ ($b_0, \ldots, b_{B-1}$) into one or multiple code blocks $c_{r,k}$ ($c_{r,0}, \ldots, c_{r,Kr-1}$). r represents an index of a code block included in the transport block $b_k$. Kr represents the number of bits included in the r-th code block. Kr is also referred to as a code block size.

The transport block $b_k$ is segmented into the one or multiple code blocks $c_{r,k}$ the number of which does not exceed a Maximum code block size $K_{cb}$. The maximum code block size $K_{cb}$ may be given based on at least a base graph used in LDPC coding. For example, in a case that the base graph used in the LDPC coding is a base graph 1, the maximum code block size $K_{cb}$ may be 8448. In a case that the base graph used in the LDPC coding is a base graph 2, the maximum code block size $K_{cb}$ may be 3840.

In a case that the number of code blocks included in the transport block $b_k$ is equal to or more than two, a second CRC sequence $q_{r,k}$ ($q_{r,0}, \ldots, q_{r,L2-1}$) is given to each of the one or multiple code blocks $c_{r,k}$. L2 corresponds to the number of parity bits included in the second CRC sequence. The second CRC sequence $q_{r,k}$ is added to each of the one or multiple code blocks to generate one or multiple code blocks $C_{r,k}$ ($C_{r,0}, \ldots, C_{r,Kr-1}, C_{r,Kr}, \ldots, C_{r,Kr+L2-1}$). In a case that the number of code blocks included in the transport block $b_k$ is one, the second CRC sequence $q_{0,k}$ is not added to the code block $c_{0,k}$. Specifically, in a case that the number of code blocks included in the transport block $b_k$ is one, the code block $C_{0,k}$ is equal to the code block $c_{0,k}$.

The LDPC encoder 3003 performs the LDPC coding on each of one or multiple code blocks $C_{r,k}$ to generate a coded bit sequence $d_{r,k}$ ($d_{r,0}, \ldots, d_{r,N-1}$). Here, the code block input to the LDPC encoder 3003 is also referred to as a code block $C_k$. The code block $C_k$ represents at least one of one or multiple code blocks corresponding to the transport block $a_k$. The LDPC encoder 3003 performs the LDPC coding on the input code block $C_k$ to generate a coded bit sequence $d_k$ ($d_0, \ldots, d_{N-1}$). N corresponds to the number of coded bits of the coded bit sequence $d_{r,k}$ and/or coded bit sequence $d_k$.

The number of bits included in the code block $C_k$ input to the LDPC encoder 3003 is also referred to as $K_{input}$. Specifically, in the case that the number of code blocks included in the transport block $b_k$ is equal to or more than two, $K_{input}$ may be $K_{input}=K_r$. In the case that the number of code blocks included in the transport block $b_k$ is one, $K_{input}$ may be $K_{input}=Kr+L2$.

A coding matrix $H_{matrix}$ used to generate the coded bit sequence $d_k$ is given based on at least the base graph and a lift size $Z_c$. Here, the coding matrix $H_{matrix}$ satisfies conditions expressed by Equation (3) below.

$$H_{matrix} = \begin{bmatrix} c_{vector} \\ w_{vector} \end{bmatrix} = O_{vector} \quad \text{[Equation 3]}$$

Here, $c_{vector}$ may represent a column vector constituted by the code block $C_k$. $c_{vector}$ may represent a column vector having the number of rows of $K_{input}$ and the number of columns of one. w vector may represent a column vector constituted by parity bits that are obtained by performing the LDPC coding on the code block $C_k$. $c_{vector}$ may represent a column vector having the number of rows of N+2Zc−K and the number of columns of one. $O_{vector}$ may represent a column vector having the number of rows of N+2Zc and the number of columns of one.

The lift size Zc may be a value used at least to generate the coding matrix $H_{matrix}$.

The bit selection unit 3004 creates a cyclic buffer according to a prescribed procedure based on the coded bit sequence $d_k$. A length of the cyclic buffer is N. A rate matching sequence $e_k$ ($e_0, \ldots, e_{E-1}$) output by the bit selection unit 3004 is generated by reading E bits of the cyclic buffer starting from a prescribed position. Here, E may represent the number of resource elements used for the UL-SCH. A method of determining E will be described later in detail. The prescribed position may be a position indicated based on at least a Redundancy Version (RV). The redundancy version may be given based on at least the uplink grant.

The bit interleaving unit 3005 interleaves the rate matching sequence $e_k$ based on a prescribed rule to generate an interleaved sequence $f_k$ ($f_0, \ldots, f_{E-1}$).

The code block concatenation unit 3006 concatenates the interleaved sequences $f_k$ respectively corresponding to one or multiple code blocks $C_{r,k}$ to generate a concatenated sequence $g_k$.

Hereinafter, a coding method of a bit sequence of UCI $c^{UCI}_k$ ($c^{UCI}_0, \ldots, c^{UCI}_{KUCI-1}$) transmitted on the PUSCH. KUCI represents the number of bits of the UCI transmitted on the PUSCH. The bit sequence $c^{UCI}_k$ is coded to obtain a coded bit sequence $d^{UCI}_k$ ($d^{UCI}_0, \ldots, d^{UCI}_{NUCI-1}$). NUCI represents the number of bits included in the coded bit sequence.

FIG. 5 is a diagram illustrating an example of a first coding method of the bit sequence $c^{UCI}_0$ in a case that KUCI is 1 according to one aspect of the present embodiment. In FIG. 5, y indicate that the same value as $c^{UCI}_0$ is input. y may indicate that the same value as the immediately preceding bit is input. x may indicate that a prescribed value is input. For example, the prescribed value may be one. The prescribed value may be zero. $Q_m$ may represent an index (modulation order) corresponding to a modulation scheme for the PUSCH. $Q_m=2$ may correspond to QPSK. $Q_m=4$ may correspond to 16 QAM. $Q_m=6$ may correspond to 64 QAM. $Q_m=8$ may correspond to 256 QAM. In the first coding method in which KUCI is 1, N may be $N=Q_m$.

The coding method of the bit sequence $c^{UCI}_0$ in the case that KUCI is 1 may be a repetitive code. In the case that KUCI is 1, the bit sequence $c^{UCI}_0$ may not be coded. For the bit sequence $c^{UCI}_0$ in the case that KUCI is 1, $c^{UCI}_0$ may be $c^{UCI}_0 = d^{UCI}_0$.

FIG. 6 is a diagram illustrating an example of the first coding method of a bit sequence $c^{UCI}_k$ ($c^{UCI}_0, c^{UCI}_1$) in a case that KUCI is 2 according to one aspect of the present embodiment. Here, $c^{UCI}_2$ may be given by $c^{UCI}_2 = \text{mod}(c^{UCI}_0 + c^{UCI}_1, 2)$. In the first coding method in the case that the KUCI is 1, N may be $N = 3Q_m$.

In a case that KUCI is 3 or more and KUCI is 11 or less, the bit sequence $c^{UCI}_k$ may be a coding scheme that is scrambled based on a prescribed sequence. In a case that KUCI is 3 or more and KUCI is 11 or less, the bit sequence $c^{UCI}_k$ may be coded based on a Reed-Muller code. The Read-Miller code is a type of block code.

In a case the KUCI is 12 or more, KUCI may be coded based on a polar code.

The coded bit sequence $d^{UCI}_k$ may be input to a cyclic buffer having a length of $N_{UCI}$. A UCI rate matching sequence $e^{UCI}_k$ is generated by reading $E_{UCI}$ bits of the cyclic buffer staring from a prescribed position. Here, the $E_{UCI}$ may be the number of resource elements used for the UCI. $E_{UCI}$ may represent values different for each type of the UCI (first CSI, second CSI, and HARQ-ACK). A method of determining $E_{UCI}$ will be described later in detail.

A rate matching sequence $e^{UCI}k$ for the first CSI is also referred to as a rate matching sequence $e^{UCI}_k$. A rate matching sequence $e^{UCI}k$ for the second CSI is also referred to as a rate matching sequence $e^{CSI2}_k$. A rate matching sequence $e^{UCI}k$ for the HARQ-ACK is also referred to as a rate matching sequence $e^{HARQ-ACK}_k$.

The first CSI may include at least the RI. The first CSI may include at least a part or all of the CQI. The second CSI may include at least the PMI. The second CSI may include at least a CQI other than the CQI included in the first CSI. The number of bits of CSI included in the second CSI may be given based on at least a value indicated by the first CSI.

Hereinafter, an example of a method for mapping the concatenated sequence $g_k$ and the rate matching sequence $e^{UCI}_k$ to the PUSCH will be described.

Figure 7:
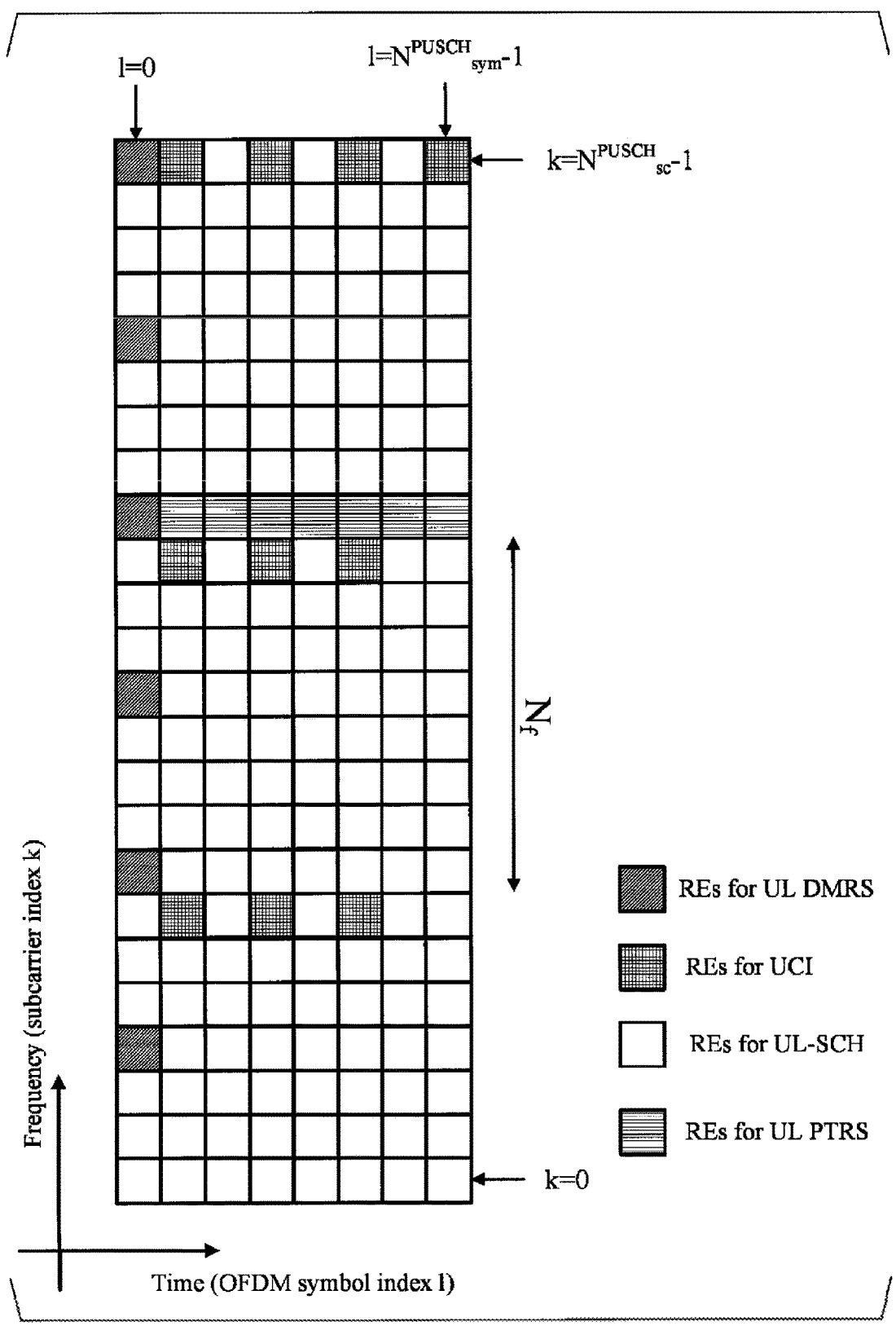
FIG. 7 is a diagram illustrating an example of mapping of a concatenated sequence $g_k$ and a rate matching sequence $e^{UCI}_k$ to PUSCH resource elements according to one aspect of the present embodiment.

FIG. 7 is a diagram illustrating an example of mapping of the concatenated sequence $g_k$ and the rate matching sequence $e^{UCI}_k$ to the PUSCH resource elements according to one aspect of the present embodiment. In FIG. 7, hatched elements are resource elements for mapping the UL DMRS, and lattice pattern elements are resource elements for mapping the UCI (the rate matching sequence $e^{UCI}_k$)(a fourth resource group), and horizontal lines pattern elements are resource elements for mapping the UL PTRS (a third resource group). Non-patterned elements are resource elements for mapping the UL-SCH (the concatenated sequence $g_k$)(a first resource group). The mapping of the UL DMRS may be given based on at least one or both of the higher layer parameter and/or the uplink grant. The mapping of the UL PTRS may be given based on at least one or both of the higher layer parameter and/or the uplink grant. The rate matching sequence $e^{UCI}_k$ may not be mapped to at least the RE to which the UL DMRS is mapped. The rate matching sequence $e^{UCI}_k$ may not be mapped to at least the OFDM symbol including the RE to which the UL DMRS is mapped. The rate matching sequence $e^{UCI}_k$ may not be mapped to at least the RE to which the UL PTRS is mapped.

In FIG. 7, the number $N^{PUSCH}_{sc}$ of subcarriers of the PUSCH is 24, and the number $N^{PUSCH}_{sym}$ of OFDM symbols of the PUSCH is 8. For example, the resource elements to which the UCI is mapped in the frequency domain may be given based on at least a value $N^{PUSCH}_{sc}-N^{PTRS}_{sc}$ that is obtained by subtracting the number $N^{PTRS}_{sc}$ of subcarriers including at least the resource elements to which the PTRS is mapped, from the number $N^{PUSCH}_{sc}$ of subcarrier of the PUSCH. For example, a spacing $N_f$ for the subcarriers to which the UCI is mapped may be $N_f=\text{floor}(O_{UCI\_sym}/(N^{PUSCH}_{sc}-N^{PTRS}_{sc}))$. Here, $O_{UCI\_sym}$ represents the number of coded modulation symbols of the UCI per OFDM symbol. $O_{UCI\_sym}$ may be $O_{UCI\_sym}=\text{floor}(O_{UCI}/N^{UCI}_{sym})$. $O_{UCI}$ may represent the number of coded modulation symbols of the UCI. $O_{UCI}$ may be given based on at least some or all of the higher layer parameter, the uplink grant, the MCS for the PUSCH, the number $N^{PUSCH}_{sc}$ of subcarriers of the PUSCH, and the number $N^{PUSCH}_{sym}$ of OFDM symbols of the PUSCH. $N^{UCI}_{sym}$ may represent the number of OFDM symbols to which the UCI is mapped. One coded modulation symbol may correspond to one resource element.

Figure 8:
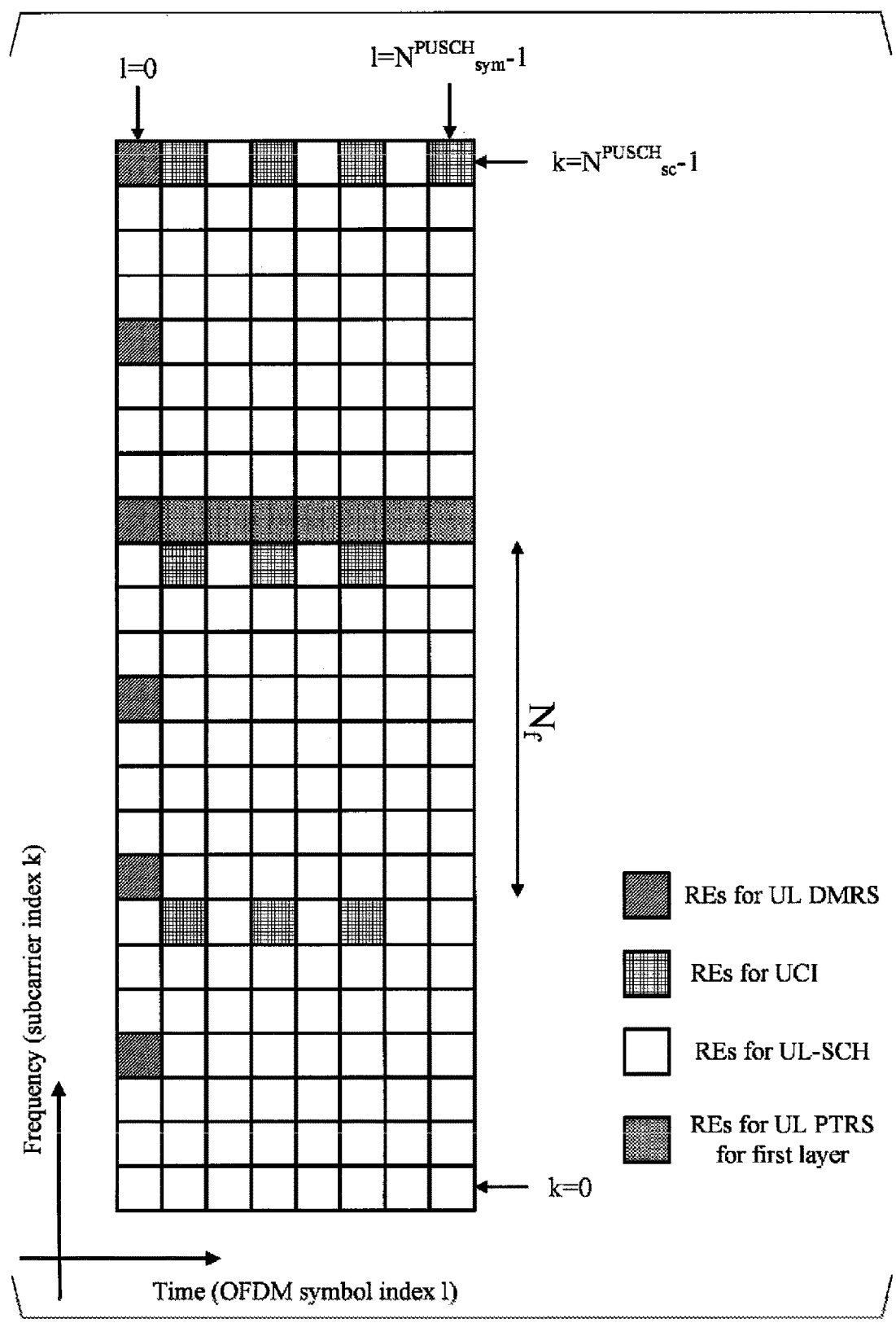
FIG. 8 is a diagram illustrating an example of, in a case that one codeword is mapped to a first antenna port and a second antenna port, mapping of a concatenated sequence $g_k$ and a rate matching sequence $e^{UCI}_k$ for the second antenna port to the PUSCH according to one aspect of the present embodiment.

FIG. 8 is a diagram illustrating an example of, in a case that one codeword is mapped to the first antenna port and the second antenna port, mapping of the concatenated sequence $g_k$ and the rate matching sequence $e^{UCI}_k$ for the second antenna port to the PUSCH according to one aspect of the present embodiment. It is assumed that the mapping of the concatenated sequence $g_k$ and the rate matching sequence $e^{UCI}_k$ for the first antenna port to the PUSCH is based on the mapping illustrated in FIG. 7. In FIG. 8, hatched elements are resource elements for mapping the UL DMRS, and lattice pattern elements are resource elements for mapping the UCI (the rate matching sequence $e^{UCI}_k$)(a fifth resource group), and dotted elements indicate a sixth resource group. Furthermore, non-patterned elements are resource elements for mapping the UL-SCH (the concatenated sequence $g_k$)(a second resource group). The concatenated sequence $g_k$ is also referred to as the UL-SCH or the transport block. The rate matching sequence $e^{UCI}_k$ is also referred to as the UCI.

The first antenna port may be an antenna port to which at least the UL PTRS is mapped. The second antenna port may be an antenna port to which the UL PTRS is not mapped. The UL PTRS may be mapped to at least a resource element of the first antenna port. The UL PTRS may not be mapped to a resource element of the second antenna port.

The concatenated sequence $g_k$ may be mapped to at least the first resource group of the first antenna port. The first resource group corresponds to the non-patterned elements in FIG. 7. The first resource group includes at least the resource element of the first antenna port. The concatenated sequence $g_k$ may be mapped to at least the second resource group of the second antenna port. The second resource group corresponds to the non-patterned elements in FIG. 8. The second resource group includes at least the resource element of the second antenna port.

The UL PTRS may be mapped to the third resource group of the first antenna port. The third resource group corresponds to the horizontal lines pattern elements in FIG. 7. The third resource group includes at least the resource element of the first antenna port.

The rate matching sequence $e^{UCI}_k$ may be mapped to at least the fourth resource group of the first antenna port. The fourth resource group corresponds to the lattice pattern elements in FIG. 7. The fourth resource group includes at least the resource element of the first antenna port. The rate matching sequence $e^{UCI}_k$ may be mapped to at least the fifth resource group of the second antenna port. The fifth resource group corresponds to the lattice pattern elements in FIG. 8. The fifth resource group includes at least the resource element of the second antenna port.

The rate matching sequence $e^{UCI}_k$ may be mapped to at least some or all of the resource elements other than the resource elements included in the sixth resource group of the second antenna port. The sixth resource group corresponds to the dotted elements in FIG. 8. The sixth resource group includes at least the resource element of the second antenna port.

The sixth resource group may be a group of resources that include at least some or all of the following elements 1 to 4: Element 1) resource elements of one or multiple second antenna ports, the resource elements having the index pairs the same as the index pairs of the resource elements of one or multiple first antenna ports to which the UL PTRS corresponding to the first antenna port is mapped, Elements 2) An OFDM symbol, among the OFDM symbols included in the PUSCH, including at least the resource element of the second antenna port, the resource element having the index pair the same as the index pair of the resource element of the first antenna port to which the UL PTRS corresponding to the first antenna port is mapped, Element 3) A subcarrier, among the subcarriers included in the PUSCH, including at least the resource elements of one or multiple second antenna ports, the resource elements having the index pairs the same as the index pairs of the resource elements of the first antenna port to which the UL PTRS corresponding to the first antenna port is mapped, Element 4) resource elements of one or multiple second antenna ports, the resource elements having the index pairs the same as the index pairs of the resource elements of the first antenna port to which the rate matching sequence $e^{CSI2}_k$ for the second CSI is mapped.

The resource group may be a group of resources including one or multiple resource elements.

The rate matching sequence $e^{UCI}_k$ may not be mapped to the sixth resource group. For example, the rate matching sequence $e^{UCI}_k$ not being mapped to a second resource element having the index pair the same as the index pair of the resource element of the first antenna port for mapping the UL PTRS corresponding to the first antenna port allows a transmission diversity effect and an effect of reducing interlayer interference to be expected.

In a case that the UL PTRS is mapped to the first antenna port and the UL PTRS is not mapped to the second antenna port, the mapping of the rate matching sequence $e^{UCI}_k$ for the second antenna port may be the same as the mapping of the rate matching sequence $e^{UCI}_k$ for the first antenna port.

At least in the codebook based transmission, the first antenna port may correspond to the first layer and the second layer. At least in the codebook based transmission, the second antenna port may correspond to the first layer and the second layer. In at least the non codebook based transmission, the first antenna port may correspond to the first layer. In at least the non codebook based transmission, the second antenna port may correspond to the second layer.

For the first antenna port, the rate matching sequence $e^{UCI}_k$ may be mapped, avoiding at least the UL PTRS corresponding to the first antenna port. For the first antenna port, the rate matching sequence $e^{UCI}_k$ may be mapped to some or all of the resource elements of the first antenna port other than the resource elements of the first antenna port to which the UL PTRS corresponding to the first antenna port is mapped.

In the mapping of the rate matching sequence $e^{UCI}_k$, the index pair of the resource element included in the fourth resource group may be different from any of the index pairs of the resource elements included in the third resource group.

For the second antenna port, the rate matching sequence $e^{UCI}_k$ may be mapped, avoiding at least the sixth resource group. For the second antenna port, the rate matching sequence $e^{UCI}_k$ may be mapped to at least the resource elements of the second antenna port other than the resource elements included in the sixth resource group.

The rate matching sequence $e^{UCI}_k$ may be mapped, avoiding at least the resource element of second first antenna port, the resource element having the same index pair as the resource element of the first antenna port to which the UL PTRS corresponding to the first antenna port is mapped. The rate matching sequence $e^{UCI}_k$ may not be mapped to at least the resource element of the second antenna port, the resource element having the same index pair as the resource element included in the third resource group.

In the mapping of the rate matching sequence $e^{UCI}_k$, the index pair of the resource element included in the fifth resource group may be different from any of the index pairs of the resource elements included in the third resource group.

In the mapping of the rate matching sequence $e^{UCI}_k$, the index pair of the resource element included in the fifth resource group may be given based on at least the resource elements included in the third resource group.

In the mapping of the rate matching sequence $e^{UCI}_k$, the index pairs of the all resource elements included in the fifth resource group may be the same as any of the index pairs of the resource elements included in the fourth resource group.

Whether the rate matching sequence $e^{UCI}_k$ for the second antenna port is mapped with avoiding at least the sixth resource group or not may be given for each UCI type. For the second antenna port, whether the rate matching sequence $e^{UCI}_k$ is mapped at least to the resource elements of the second antenna port other than the resource elements included in the sixth resource group or not may be given for each type of UCI.

Whether the rate matching sequence $e^{UCI}_k$ is mapped avoiding at least the resource element of the second antenna port which have the same index pair as the resource element of the first antenna port to which the UL PTRS which corresponds to the first antenna port or not, may be given for each type of UCI. Whether the rate matching sequence $e^{UCI}_k$ is mapped at least to the resource element of the second antenna port which have the same index pair as the resource element included in the third resource group or not may be given for each type of UCI.

In the mapping of the rate matching sequence $e^{UCI}_k$, whether the index pair of the resource element included in the fifth resource group is different from any of the index pairs of the resource elements included in the third resource group or not, may be given for each type of UCI.

In the mapping of the rate matching sequence $e^{UCI}_k$, whether the index pair of the resource element included in the fifth resource group is based on at least the resource elements included in the third resource group or not, may be given for each type of UCI.

In the mapping of the rate matching sequence $e^{UCI}_k$, whether the index pairs of the all resource elements included in the fifth resource group are the same as any of the index pairs of the resource elements included in the fourth resource group or not, may be given for each type of UCI.

For the second antenna port, the rate matching sequence $e^{CSI1}_k$ for the first CSI may be mapped, avoiding at least the sixth resource group. For the second antenna port, the rate matching sequence $e^{CSI1}_k$ for the first CSI may be mapped to at least the resource elements of the second antenna port other than the resource elements included in the sixth resource group.

The rate matching sequence $e^{CSI1}_k$ for the first CSI may be mapped, avoiding at least the resource element of second first antenna port, the resource element having the same index pair as the resource element of the first antenna port to which the UL PTRS corresponding to the first antenna port is mapped. The rate matching sequence $e^{CSI1}_k$ for the first CSI may not be mapped to at least the resource element of the second antenna port, the resource element having the same index pair as the resource element included in the third resource group.

In the mapping of the rate matching sequence $e^{CSI1}_k$ for the first CSI, the index pair of the resource element included in the fifth resource group may be different from any of the index pairs of the resource elements included in the third resource group.

In the mapping of the rate matching sequence $E^{CSI1}_k$ for the first CSI, the index pair of the resource element included in the fifth resource group may be given based on at least the resource elements included in the third resource group.

In the mapping of the rate matching sequence $e^{CSI1}_k$ for the first CSI, the index pairs of the all resource elements included in the fifth resource group may be the same as any of the index pairs of the resource elements included in the fourth resource group.

The rate matching sequence $E^{CSI1}_k$ for the first CSI is also referred to as the first CSI.

For the second antenna port, the rate matching sequence $e^{CSI2}_k$ for the second CSI may be mapped to at least some or all of the resource elements included in the sixth resource group.

The rate matching sequence $e^{CSI2}_k$ for the second CSI may be mapped to at least some or all of the resource elements of the second antenna port, the resource elements having the index pairs the same as the index pairs of the resource elements of the first antenna port to which the UL PTRS corresponding to the first antenna port is mapped. The rate matching sequence $e^{CSI2}_k$ for the second CSI may be mapped to at least some or all of the resource elements of the second antenna port, the resource elements having the same index pairs as the resource elements included in the third resource group.

In the mapping of the rate matching sequence $e^{CSI2}_k$ for the second CSI, some or all of the index pairs of the resource elements included in the fifth resource group may be the same as any of the index pairs of the resource elements included in the third resource group.

In the mapping of the rate matching sequence $e^{CSI2}_k$ for the second CSI, the fifth resource group may include at least a first resource element. The first resource element is a resource element of the second antenna port, the resource element having the index pair the same as any of the index pairs of the resource elements included in the third resource group.

In the mapping of the rate matching sequence $e^{CSI2}_k$ for the second CSI, the index pair of the resource element included in the fifth resource group may be given regardless of the resource elements included in the third resource group.

In the mapping of the rate matching sequence $e^{CSI2}_k$ for the second CSI, some or all of the index pairs of the resource elements included in the fifth resource group may be different from any of the index pairs of the resource elements included in the fourth resource group.

The rate matching sequence $e^{CSI2}_k$ for the second CSI is also referred to as the second CSI.

For the second antenna port, the rate matching sequence $e^{HARQ-ACK}_k$ for the HARQ-ACK may be mapped, avoiding at least the sixth resource group. For the second antenna port, the rate matching sequence $e^{HARQ-ACK}_k$ for the HARQ-ACK may be mapped to at least the resource elements of the second antenna port other than the resource elements included in the sixth resource group.

The rate matching sequence $e^{HARQ-ACK}_k$ for the HARQ-ACK may be mapped, avoiding at least the resource element of second first antenna port, the resource element having the same index pair as the resource element of the first antenna port to which the UL PTRS corresponding to the first antenna port is mapped. The rate matching sequence $e^{HARQ-ACK}_k$ for the HARQ-ACK may not be mapped to at least the resource element of the second antenna port, the resource element having the same index pair as the resource element included in the third resource group.

In the mapping of the rate matching sequence $e^{HARQ-ACK}_k$ for the HARQ-ACK, the index pair of the resource element included in the fifth resource group may be different from any of the index pairs of the resource elements included in the third resource group.

In the mapping of the rate matching sequence $e^{HARQ-ACK}_k$ for the HARQ-ACK, the index pair of the resource element included in the fifth resource group may be given based on at least the resource elements included in the third resource group.

In the mapping of the rate matching sequence $e^{HARQ-ACK}_k$ for the HARQ-ACK, the index pairs of the all resource elements included in the fifth resource group may be the same as any of the index pairs of the resource elements included in the fourth resource group.

The rate matching sequence $e^{HARQ-ACK}_k$ for the HARQ-ACK is also referred to as the HARQ-ACK.

For the second antenna port, whether the rate matching sequence $e^{UCI}_k$ is mapped avoiding at least the sixth resource group or not, may be given based on at least the number KUCI of bits of the UCI which is mapped to the PUSCH. For the second antenna port, whether the rate matching sequence $e^{HARQ-ACK}_k$ for the HARQ-ACK is mapped at least to the resource elements of the second antenna port other than the resource elements included in the sixth resource group or not, may be given at least based on the number KUCI of bits of the UCI which is mapped to the PUSCH.

Whether the rate matching sequence $e^{UCI}_k$ is mapped avoiding at least the resource element of the second antenna port which has the same index pair as the resource element of the first antenna port to which the UL PTRS which corresponds to the first antenna port is mapped or not, may be given for each type of UCI. Whether the rate matching sequence $e^{UCI}_k$ is mapped to at least the resource element of the second antenna port which has the same index pair as the resource element included in the third resource group or not, may be given based on at least the number KUCI of bits of the UCI which is mapped to the PUSCH.

In the mapping of the rate matching sequence $e^{UCI}_k$, whether the index pair of the resource element included in the fifth resource group is different from any of the index pairs of the resource elements included in the third resource group or not, may be given based on at least the number KUCI of bits of the UCI which is mapped to the PUSCH.

In the mapping of the rate matching sequence $e^{UCI}_k$, whether the index pair of the resource element included in the fifth resource group is based on at least the resource elements included in the third resource group or not, may be given based on at least the number KUCI of bits of the UCI which is mapped to the PUSCH.

In the mapping of the rate matching sequence $e^{UCI}_k$, whether the index pairs of the all resource elements included in the fifth resource group are the same as any of the index pairs of the resource elements included in the fourth resource group or not, may be given based on at least the number KUCI of bits of the UCI which is mapped to the PUSCH.

In a case that the number KUCI of bits of the UCI mapped to the PUSCH satisfies a prescribed condition, for the second antenna port, the rate matching sequence $e^{UCI}_k$ may be mapped, avoiding at least the sixth resource group. The prescribed condition may be that the number KUCI of bits of the UCI is 2 or less. In the case that the number KUCI of bits of the UCI mapped to the PUSCH satisfies the prescribed condition, for the second antenna port, the rate matching sequence $e^{UCI}_k$ may be mapped to at least the resource elements of the second antenna port other than the resource elements included in the sixth resource group.

In the case that the number KUCI of bits of the UCI mapped to the PUSCH satisfies the prescribed condition, the rate matching sequence $e^{UCI}_k$ may be mapped, avoiding at least the resource element of second first antenna port, the resource element having the same index pair as the resource element of the first antenna port to which the UL PTRS corresponding to the first antenna port is mapped. In the case that the number KUCI of bits of the UCI mapped to the PUSCH satisfies the prescribed condition, the rate matching sequence $e^{UCI}_k$ may not be mapped to at least the resource element of the second antenna port, the resource element having the same index pair as the resource element included in the third resource group.

In the mapping of the rate matching sequence $e^{UCI}_k$, in the case that the number KUCI of bits of the UCI mapped to the PUSCH satisfies the prescribed condition, the index pair of the resource element included in the fifth resource group may be different from any of the index pairs of the resource elements included in the third resource group.

In the mapping of the rate matching sequence $e^{UCI}_k$, in the case that the number KUCI of bits of the UCI mapped to the PUSCH satisfies the prescribed condition, the index pair of the resource element included in the fifth resource group may be given based on at least the resource elements included in the third resource group.

In the mapping of the rate matching sequence $e^{UCI}_k$, in the case that the number KUCI of bits of the UCI mapped to the PUSCH satisfies the prescribed condition, the index pairs of the all resource elements included in the fifth resource group may be the same as any of the index pairs of the resource elements included in the fourth resource group.

In the case that the number KUCI of bits of the UCI mapped to the PUSCH does not satisfy the prescribed condition, for the second antenna port, the rate matching sequence $e^{UCI}_k$ may be mapped to at least some or all of the resource elements included in the sixth resource group.

In the case that the number KUCI of bits of the UCI mapped to the PUSCH does not satisfy the prescribed condition, the rate matching sequence $e^{UCI}_k$ may be mapped to at least some or all of the resource elements of second first antenna port, the resource elements having the same index pairs as the resource elements of the first antenna port to which the UL PTRS corresponding to the first antenna port is mapped. In the case that the number KUCI of bits of the UCI mapped to the PUSCH does not satisfy the prescribed condition, the rate matching sequence $e^{UCI}_k$ may be mapped to some or all of the resource elements of the second antenna port, the resource elements having the same index pairs as the resource elements included in the third resource group.

In the mapping of the rate matching sequence $e^{UCI}_k$, in the case that the number KUCI of bits of the UCI mapped to the PUSCH does not satisfy the prescribed condition, some or all of the index pairs of the resource elements included in the fifth resource group may be the same as any of the index pairs of the resource elements included in the third resource group.

In the mapping of the rate matching sequence $e^{UCI}_k$, in the case that the number KUCI of bits of the UCI mapped to the PUSCH does not satisfy the prescribed condition, the fifth resource group may include at least the first resource element.

In the mapping of the rate matching sequence $e^{UCI}_k$, in the case that the number KUCI of bits of the UCI mapped to the PUSCH does not satisfy the prescribed condition, the index pair of the resource element included in the fifth resource group may be given regardless of the resource elements included in the third resource group.

In the mapping of the rate matching sequence $e^{UCI}_k$, in the case that the number KUCI of bits of the UCI mapped to the PUSCH does not satisfy the prescribed condition, some or all of the index pairs of the resource elements included in the fifth resource group may be different from any of the index pairs of the resource elements included in the fourth resource group.

The concatenated sequence $g_k$ may be mapped to at least a part or all of the sixth resource group.

At least one of the index pairs of the resource elements included in the second resource group may be the same as any of the index pairs of the resource elements included in the third resource group.

The second resource group may include at least the first resource element.

The rate matching sequence $e^{UCI}_k$ being mapped to the resource element means that a complex-valued modulation symbol generated from the rate matching sequence $e^{UCI}_k$ is mapped to the resource element. The interleaved sequence $g_k$ being mapped to the resource element means that a complex-valued modulation symbol generated from the interleaved sequence $g_k$ is mapped to the resource element.

A configuration example of the terminal apparatus 1 according to the one aspect of the present embodiment will be described below.

Figure 9:
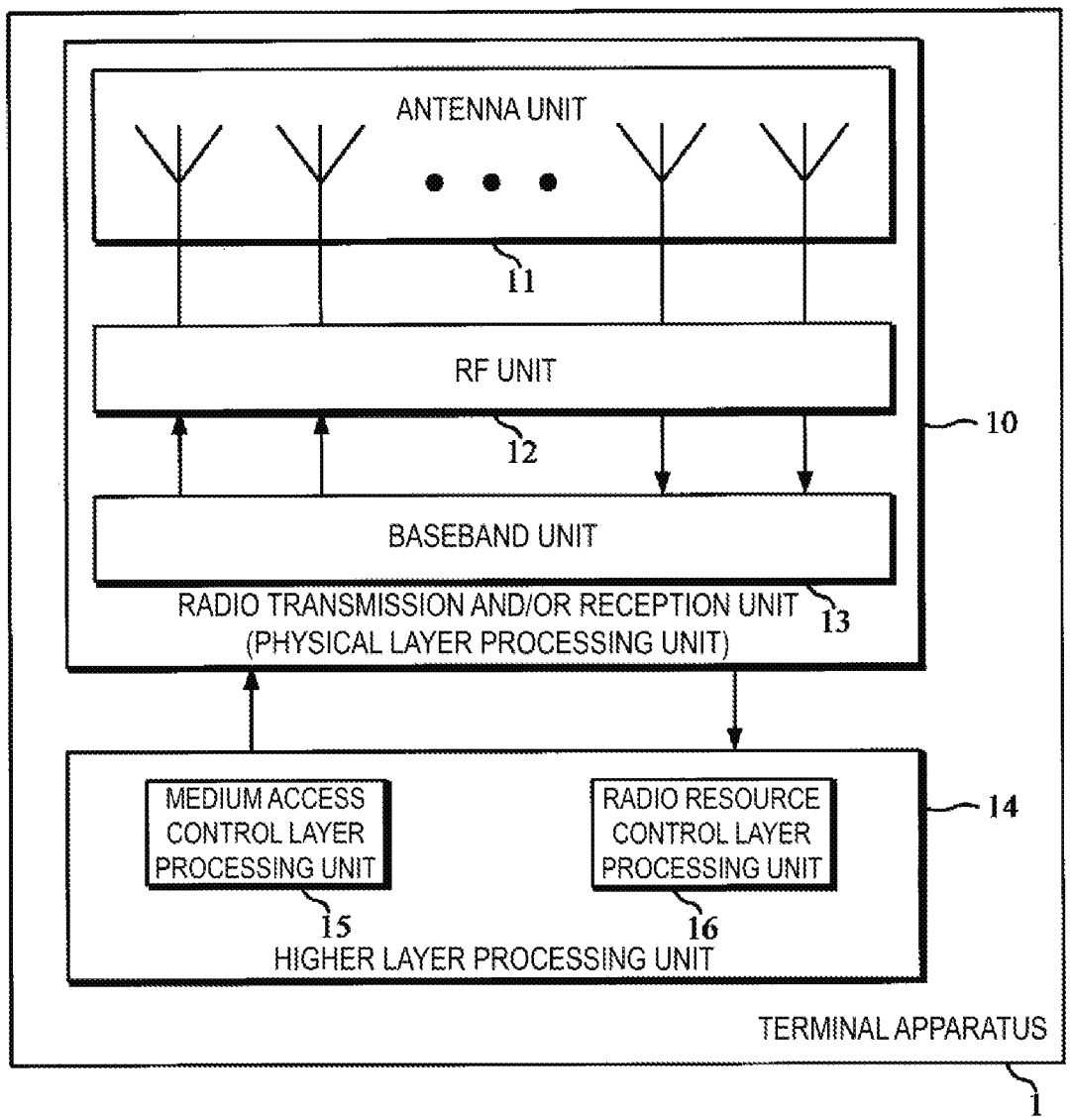
FIG. 9 is a schematic block diagram illustrating a configuration of a terminal apparatus 1 according to one aspect of the present embodiment.

FIG. 9 is a schematic block diagram illustrating a configuration of the terminal apparatus 1 according to one aspect of the present embodiment. As illustrated, the terminal apparatus 1 includes a radio transmission and/or reception unit 10 and a higher layer processing unit 14. The radio transmission and/or reception unit 10 includes at least some or all of an antenna unit 11, a Radio Frequency (RF) unit 12, and a baseband unit 13. The higher layer processing unit 14 includes at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3. The parameter may be a higher layer parameter.

The radio transmission and/or reception unit 10 performs processing of the physical layer, such as modulation, demodulation, coding, decoding, and the like. The radio transmission and/or reception unit 10 demultiplexes, demodulates, and decodes a received physical signal, and outputs the information resulting from the decoding to the higher layer processing unit 14. The radio transmission and/or reception unit 10 generates a physical signal by modulating and coding data, and generating a baseband signal (converting to a time-continuous signal) to transmit the generated physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 10:
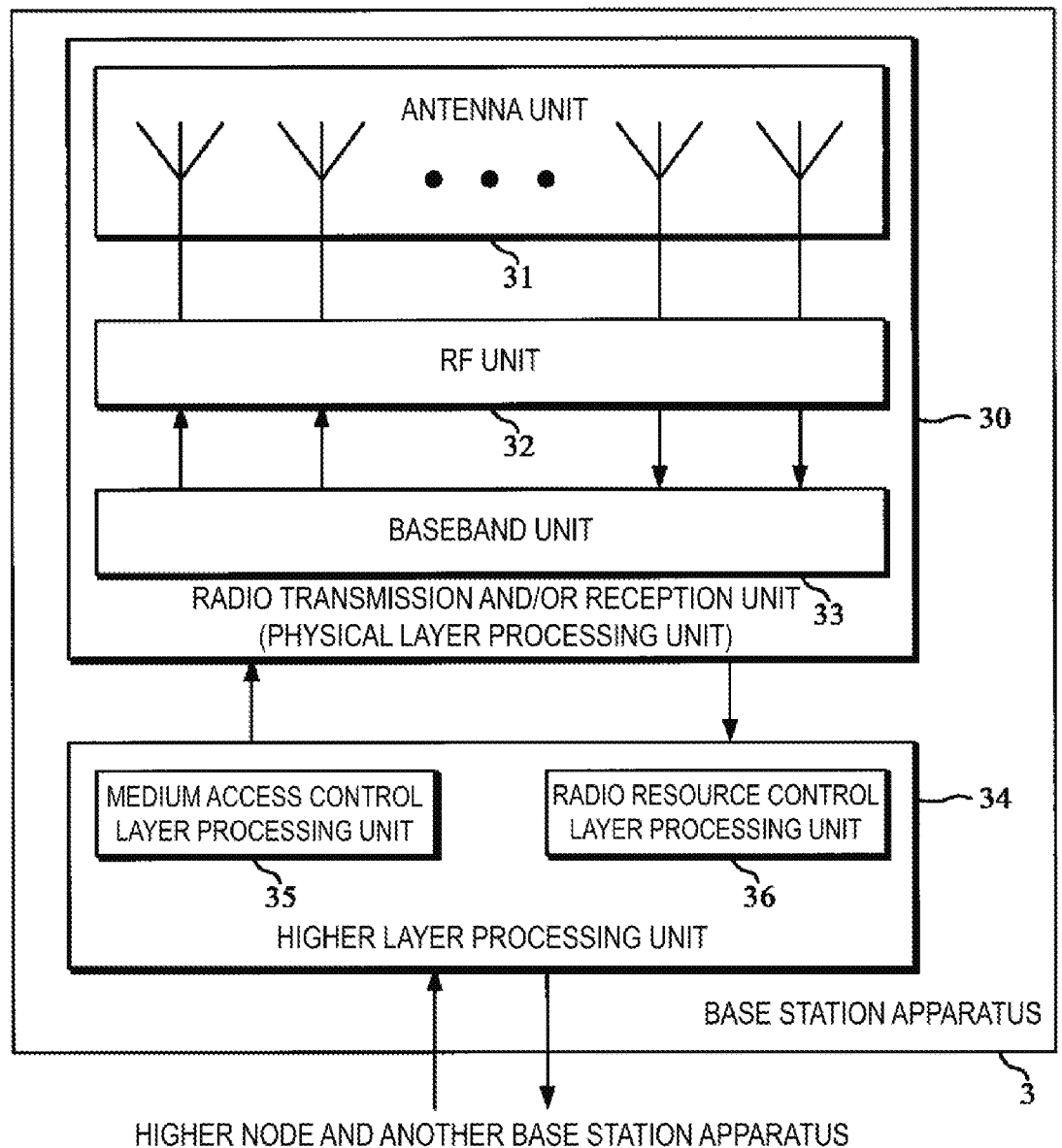
FIG. 10 is a schematic block diagram illustrating a configuration of a base station apparatus 3 according to one aspect of the present embodiment.

FIG. 10 is a schematic block diagram illustrating a configuration of the base station apparatus 3 according to one aspect of the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on PDSCH, system information, an RRC message, a MAC CE, and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. In other words, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of devices according to one aspect of the present embodiment will be described below.

(1) To accomplish the object described above, aspects of the present invention are contrived to provide the following measures. Specifically, a first aspect of the present invention is a terminal apparatus including a coding unit configured to code one transport block and UCI, and a transmitter configured to transmit the one transport block and the UCI on one PUSCH. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

(2) In the first aspect of the present invention, the second resource group includes at least a first resource element of the second antenna port, and the index pair of the first resource element is the same as the index pair of the resource element included in the third resource group.

(3) A second aspect of the present invention is a base station apparatus including a receiver configured to receive one PUSCH that includes one transport block and UCI, and is transmitted, and a decoding unit configured to decode the transport block and the UCI. The one transport block is mapped to at least a first resource group of a first antenna port and a second resource group of a second antenna port. A UL PTRS is mapped to a third resource group of the first antenna port, and mapped to no resource element of the second antenna port. The UCI is mapped to at least a fourth resource group of the first antenna port and a fifth resource group of the second antenna port. An index pair of resource element included in the fifth resource group is different from any of index pairs of resource elements included in the third resource group, and the index pair is a pair of a subcarrier index and an OFDM symbol index of a resource element.

(4) In the second aspect of the present invention, the second resource group includes at least a first resource element of the second antenna port, and the index pair of the first resource element is the same as the index pair of the resource element included in the third resource group.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be the Evolved Universal Terrestrial Radio Access Network (EUTRAN) and/or the NextGen RAN, NR RAN (NG-RAN). Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit
3001 CRC generator
3002 Code block segmentation unit
3003 LDPC encoder
3004 Bit selection unit
3005 Bit interleaving unit
3006 Code block concatenation unit

The invention claimed is:
1. A terminal device comprising:
coding circuitry configured to map a first sequence for an uplink shared channel (UL-SCH), a second sequence for first channel state information (CSI), and a third sequence for second CSI to a set of elements; and
transmission circuitry configured to transmit a physical uplink shared channel (PUSCH), wherein each of the elements is identified by a subcarrier index for the PUSCH and an orthogonal frequency division multiplexing (OFDM) symbol index for the PUSCH, the first sequence is mapped to a first predetermined set of elements, the second sequence is mapped to a second predetermined set of elements avoiding the first predetermined set of elements where the mapping of the second sequence is given at least based on the first predetermined set of elements, and the third sequence is mapped to the first predetermined set of elements.

2. A communication method for a terminal device, the communication method comprising:

mapping a first sequence for an uplink shared channel (UL-SCH), a second sequence for first channel state information (C SI), and a third sequence for second CSI to a set of elements; and transmitting a physical uplink shared channel (PUSCH), wherein each of the elements is identified by a subcarrier index for the PUSCH and an orthogonal frequency division multiplexing (OFDM) symbol index for the PUSCH, the first sequence is mapped to a first predetermined set of elements, the second sequence is mapped to a second predetermined set of elements avoiding the first predetermined set of elements where the mapping of the second sequence is given at least based on the first predetermined set of elements, and the third sequence is mapped to the first predetermined set of elements.

\* \* \* \* \*